US008175331B2

(12) United States Patent
Nagaoka et al.

(10) Patent No.: US 8,175,331 B2
(45) Date of Patent: May 8, 2012

(54) VEHICLE SURROUNDINGS MONITORING APPARATUS, METHOD, AND PROGRAM

(75) Inventors: Nobuharu Nagaoka, Wako (JP); Takayuki Tsuji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1457 days.

(21) Appl. No.: 11/653,163

(22) Filed: Jan. 12, 2007

(65) Prior Publication Data

US 2007/0165910 A1 Jul. 19, 2007

(30) Foreign Application Priority Data

Jan. 17, 2006 (JP) .................................... 2006-9102

(51) Int. Cl.
*G06K 9/00* (2006.01)
(52) U.S. Cl. ......................... 382/103; 382/104; 382/106
(58) Field of Classification Search .................. 382/103, 382/104, 106, 107; 348/47, 48, 113, 148, 348/159
See application file for complete search history.

(56) References Cited

U.S. PATENT DOCUMENTS

| | | | | |
|---|---|---|---|---|
| 5,023,712 A * | 6/1991 | Kajiwara | .................. | 348/139 |
| 5,081,585 A * | 1/1992 | Kurami et al. | .................. | 701/28 |
| 5,253,050 A * | 10/1993 | Karasudani | .................. | 348/118 |
| 5,307,136 A * | 4/1994 | Saneyoshi | .................. | 356/3.14 |
| 5,355,118 A * | 10/1994 | Fukuhara | .................. | 340/435 |
| 5,424,952 A * | 6/1995 | Asayama | .................. | 701/200 |
| 5,515,448 A * | 5/1996 | Nishitani | .................. | 382/106 |
| 5,530,771 A * | 6/1996 | Maekawa | .................. | 382/103 |
| 5,680,123 A * | 10/1997 | Lee | .................. | 340/937 |
| 5,892,855 A * | 4/1999 | Kakinami et al. | .................. | 382/291 |
| 6,021,209 A * | 2/2000 | Hirabayashi et al. | .................. | 382/103 |
| 6,091,833 A * | 7/2000 | Yasui et al. | .................. | 382/104 |
| 6,115,651 A * | 9/2000 | Cruz | .................. | 701/1 |
| 6,154,149 A * | 11/2000 | Tyckowski et al. | .................. | 340/903 |
| 6,173,222 B1 * | 1/2001 | Seo et al. | .................. | 701/41 |

(Continued)

FOREIGN PATENT DOCUMENTS

DE 101 08 646 A1 8/2001

(Continued)

OTHER PUBLICATIONS

Machine Translation of JP 2001-018717.*

*Primary Examiner* — Vikkram Bali
(74) *Attorney, Agent, or Firm* — Carrier Blackman & Associates, P.C.; Joseph P. Carrier; William D. Blackman

(57) ABSTRACT

A vehicle surroundings monitoring apparatus, method, and program capable of reducing a possibility of overlap between a detection object and a background object in a standard image when detecting objects around the vehicle from images obtained by a plurality of image sensors so as to detect the objects accurately. The vehicle surroundings monitoring apparatus detects the objects existing around the vehicle (10) from the images obtained by the image sensors (2R, 2L) mounted on the vehicle (10). The vehicle surroundings monitoring apparatus includes an object extraction process unit (1) which performs a process of extracting the objects for a predetermined standard image of the images obtained by the image sensors (2R, 2L), a driving environment detection process unit (1) which detects a driving environment of the vehicle (10), and a standard image selection process unit (1) which selects the standard image for use in the process of the object extraction process unit (1) anew according to the detected driving environment.

20 Claims, 9 Drawing Sheets

U.S. PATENT DOCUMENTS

| | | | |
|---|---|---|---|
| 6,185,499 B1 * | 2/2001 | Kinoshita et al. | 701/96 |
| 6,218,960 B1 * | 4/2001 | Ishikawa et al. | 340/901 |
| 6,246,961 B1 * | 6/2001 | Sasaki et al. | 701/301 |
| 6,269,308 B1 * | 7/2001 | Kodaka et al. | 701/301 |
| 6,327,536 B1 * | 12/2001 | Tsuji et al. | 701/301 |
| 6,330,511 B2 | 12/2001 | Ogura et al. | |
| 6,396,535 B1 * | 5/2002 | Waters | 348/159 |
| 6,429,789 B1 * | 8/2002 | Kiridena et al. | 340/905 |
| 6,466,684 B1 * | 10/2002 | Sasaki et al. | 382/104 |
| 6,580,373 B1 * | 6/2003 | Ohashi | 340/901 |
| 6,594,583 B2 * | 7/2003 | Ogura et al. | 701/301 |
| 6,636,257 B1 * | 10/2003 | Harada et al. | 348/148 |
| 6,683,969 B1 * | 1/2004 | Nishigaki et al. | 382/104 |
| 6,714,139 B2 * | 3/2004 | Saito et al. | 340/903 |
| 6,734,787 B2 * | 5/2004 | Ikeda | 340/425.5 |
| 6,763,125 B2 * | 7/2004 | Ohta | 382/104 |
| 6,906,620 B2 * | 6/2005 | Nakai et al. | 340/435 |
| 6,999,602 B2 * | 2/2006 | Yoshida et al. | 382/104 |
| 7,015,828 B2 * | 3/2006 | Ueminami et al. | 340/937 |
| 7,016,517 B2 * | 3/2006 | Furusho | 382/103 |
| 7,042,389 B2 * | 5/2006 | Shirai | 342/70 |
| 7,053,795 B2 * | 5/2006 | Maemura et al. | 340/932.2 |
| 7,130,448 B2 | 10/2006 | Nagaoka et al. | |
| 7,228,212 B2 * | 6/2007 | Hijikata et al. | 701/45 |
| 7,237,641 B2 * | 7/2007 | Yanai | 180/271 |
| 7,266,221 B2 * | 9/2007 | Shima et al. | 382/106 |
| 7,433,496 B2 * | 10/2008 | Ishii et al. | 382/104 |
| 7,532,975 B2 * | 5/2009 | Ishikawa | 701/200 |
| 7,548,634 B2 * | 6/2009 | Kudo | 382/103 |
| 7,558,672 B2 * | 7/2009 | Egami et al. | 701/301 |
| 7,567,687 B2 * | 7/2009 | Kudo | 382/103 |
| 7,643,911 B2 * | 1/2010 | Ishihara et al. | 701/1 |
| 7,660,434 B2 * | 2/2010 | Kubota | 382/103 |
| 7,720,277 B2 * | 5/2010 | Hattori | 382/154 |
| 7,720,580 B2 * | 5/2010 | Higgins-Luthman | 701/28 |
| 7,747,039 B2 * | 6/2010 | Fujimoto | 382/103 |
| 2001/0031068 A1 * | 10/2001 | Ohta et al. | 382/103 |
| 2002/0134151 A1 * | 9/2002 | Naruoka et al. | 73/291 |
| 2003/0026455 A1 * | 2/2003 | Watanabe et al. | 382/104 |
| 2003/0152271 A1 * | 8/2003 | Tsujino et al. | 382/190 |
| 2004/0032971 A1 * | 2/2004 | Nagaoka et al. | 382/103 |
| 2004/0066376 A1 * | 4/2004 | Donath et al. | 345/169 |
| 2004/0247157 A1 * | 12/2004 | Lages et al. | 382/103 |
| 2005/0125121 A1 * | 6/2005 | Isaji et al. | 701/36 |
| 2005/0131646 A1 * | 6/2005 | Camus | 701/301 |
| 2005/0143887 A1 * | 6/2005 | Kinoshita | 701/45 |
| 2005/0196020 A1 * | 9/2005 | Comaniciu et al. | 382/104 |
| 2005/0248654 A1 * | 11/2005 | Tsujino et al. | 348/169 |

FOREIGN PATENT DOCUMENTS

| | | |
|---|---|---|
| DE | 103 01 468 A1 | 10/2003 |
| JP | 03-118614 | 5/1991 |
| JP | 2001-006096 | 1/2001 |
| JP | 2001-018717 | 1/2001 |
| JP | 2004-149116 | 5/2004 |
| JP | 2005-104462 | 4/2005 |

* cited by examiner

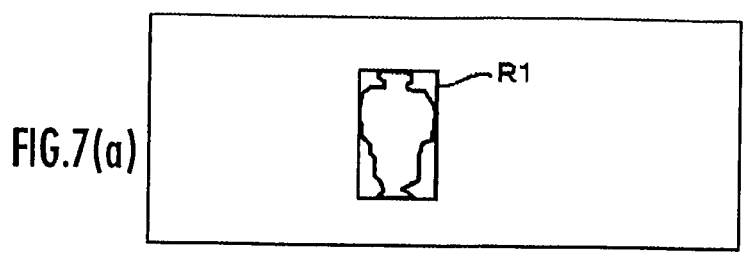
FIG.7(a)
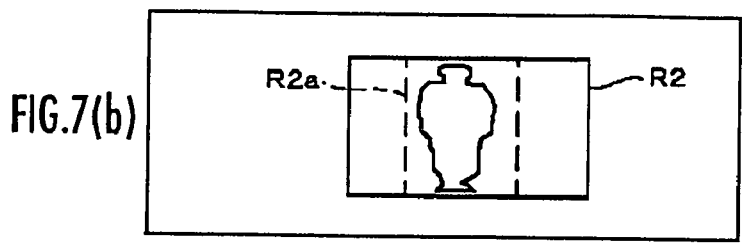
FIG.7(b)
FIG.8
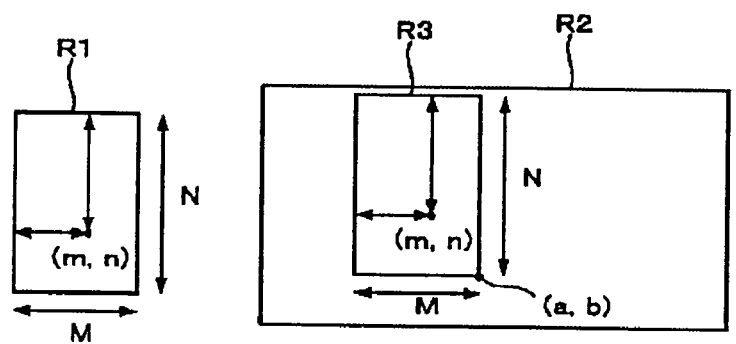
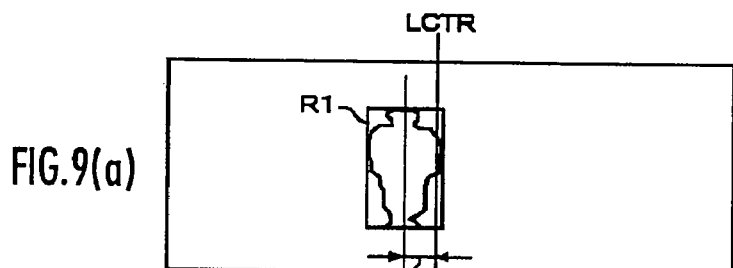
FIG.9(a)
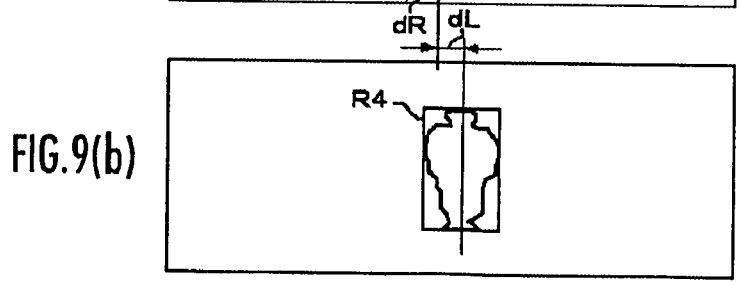
FIG.9(b)

VEHICLE SURROUNDINGS MONITORING APPARATUS, METHOD, AND PROGRAM

BACKGROUND OF THE INVENTION

1. Field of the Invention

The present invention relates to a vehicle surroundings monitoring apparatus and method which detects an object existing in the surroundings of a vehicle from images obtained by a plurality of image sensors such as cameras mounted on the vehicle, and more particularly to a program for use in causing a computer to perform processing of the apparatus.

2. Description of the Related Art

In recent years, there is known a technology of imaging the surroundings of a vehicle with a plurality of image sensors such as CCD cameras mounted on the vehicle, detecting a distance between an object such as a pedestrian existing around the vehicle and the vehicle based on a difference (parallax) between images obtained by a plurality of image sensors, determining an object such as a pedestrian at high risk of collision on the basis of the detected result, and presenting information to a driver (for example, refer to Japanese Patent Laid-Open No. 2001-6096 (hereinafter, referred to as Patent Document 1).

In the vehicle surroundings monitoring apparatus disclosed in Patent Document 1, a stereoscopic camera composed of two infrared cameras is mounted on a vehicle with an image obtained by a right camera (right image) of the stereoscopic camera used as a standard image. The vehicle surroundings monitoring apparatus binarizes the standard image by setting a value of "1" (white) if the luminance of an area is a predetermined threshold value or higher and setting "0" (black) otherwise, labels the binary image, and extracts objects existing around the vehicle. Then, the vehicle surroundings monitoring apparatus searches the image (left image) obtained by the left camera for an object corresponding to each of the objects extracted from the standard image and detects the position of the object with respect to the vehicle on the basis of the parallax between the object in the standard image and the object corresponding to the object in the left image.

In the surroundings of the vehicle, however, there may be objects (background objects) other than pedestrians or other objects as targets of detection (detection objects) such as, for example, buildings, or fences. If the surroundings are imaged by the image sensors mounted on the vehicle in this situation, the background objects are imaged as a scene together with the detection objects. Therefore, when the objects are extracted after the binarization of the obtained image, also areas corresponding to the background objects are extracted in addition to areas corresponding to the detection objects.

Moreover, if the detection object and the background object are located on a straight line, for example, viewed from the right camera in the vehicle surroundings monitoring apparatus in Patent Document 1, the detection object and the background object are extracted with the both objects overlapped with each other in the standard image. Therefore, an area corresponding to the detection object cannot be separated from an area corresponding to the background object in the standard image, by which the objects cannot be properly extracted. Accordingly, in this situation, there has been a problem that the position of an object with respect to the vehicle cannot be properly detected since the object corresponding to the extracted object cannot be found or the parallax cannot be obtained correctly.

SUMMARY OF THE INVENTION

Therefore, it is an object of the present invention to provide a vehicle surroundings monitoring apparatus and method capable of resolving the above problem and accurately detecting objects by reducing the possibility of overlap between a detection object and a background object in a standard image when detecting the objects around the vehicle from images obtained by a plurality of image sensors and to provide a vehicle surroundings monitoring program which causes a computer to perform processing of the vehicle surroundings monitoring apparatus.

To achieve the above object, according to a first aspect of the present invention, there is provided a vehicle surroundings monitoring apparatus which detects objects existing around a vehicle from images obtained by a plurality of image sensors mounted on the vehicle, comprising: an object extraction process unit which extracts the objects from a predetermined standard image of the images obtained by a plurality of the image sensors; a driving environment detection process unit which detects a driving environment of the vehicle; and a standard image selection process unit which selects anew a standard image for use in the process of the object extraction process unit out of the images obtained by a plurality of the image sensors according to the driving environment detected by the driving environment detection process unit (First invention).

In the vehicle surroundings monitoring apparatus according to the first aspect of the present invention, the object extraction process unit extracts the objects from the predetermined standard image of the images obtained by a plurality of the image sensors mounted on the vehicle. In addition, the objects around the vehicle are detected based on the objects extracted in the above process. It should be noted that the images obtained by a plurality of the image sensors mounted on the vehicle may include background objects such as, for example, a building, a fence, or the like around the road besides the detection objects such as a pedestrian. If so, the imaged background objects are extracted together with the detection objects as a result of performing the object extraction process such as, for example, binarization for the image.

In this situation, the positional relation between the detection object and the background object in the image depends upon the positional relation between the detection object and the background object with respect to each image sensor in a real space. Particularly, if the image sensor, the detection object, and the background object are located on a straight line in the real space, the detection object overlaps the background object in the image obtained by the image sensor. If the detection object overlaps the background object in the image, it is difficult to separate the detection object from the background object in the image after extracting the objects from the image.

Therefore, the driving environment detection process unit detects a vehicle driving environment. It should be noted here that the vehicle driving environment means environmental information where the degree of possibility of overlap between the detection object and the background object can be recognized or estimated in the images obtained by the image sensors mounted on the vehicle. Since the distribution of the background objects around the vehicle can be estimated based on the detected vehicle driving environment, the possibility of overlap between the detection object and the background object is found in the image obtained by each image sensor. Therefore, the standard image selection process unit can select anew an image having a lower possibility of overlap between the detection object and the background object in the image as a standard image for use in the process of the object extraction process unit by selecting the standard image out of the images obtained by a plurality of the image sensors according to the driving environment detected by the driving environment detection process unit.

Since the standard image selection process unit reduces the possibility of overlap between the detection object and the background object in the standard image as described above, the detection object is separated from the background object in the standard image and the extraction accuracy of the objects is thereby improved when the object extraction process unit performs the object extraction process for the predetermined standard image. Therefore, according to the present invention, the objects are properly extracted from the standard image and thereby the objects are accurately detected.

Furthermore, preferably the vehicle surroundings monitoring apparatus according to the first aspect of the present invention further comprises a position detection process unit which detects the position of each of the objects with respect to the vehicle based on the images obtained by a plurality of the image sensors and the objects extracted by the object extraction process unit.

According thereto, the position detection process unit detects the position of the object with respect to the vehicle based on the images obtained by a plurality of the image sensors and the objects extracted by the object extraction process unit. More specifically, for example, the position detection process unit searches an image (reference image) other than the standard image of the images obtained by a plurality of the image sensors for an object corresponding to each of the objects extracted by the object extraction process unit from the standard image. Thereafter, the position detection process unit calculates a parallax which is a difference between the position of the object in the standard image and the position of the object in the reference image and detects the position of the object with respect to the vehicle based on the calculated parallax. In this process, the standard image selection process unit reduces the possibility of overlap between the detection object and the background object in the standard image according to the present invention, which improves the object extraction accuracy of the object extraction process unit in the standard image, and therefore the position of the object can be detected with higher accuracy by using the position detection process unit.

In the vehicle surroundings monitoring apparatus according to the first aspect of the present invention, if a road where the vehicle exists has a plurality of lanes, preferably the driving environment detection process unit detects a roadside of the road where the vehicle exists as the driving environment; and the standard image selection process unit selects anew an image obtained by an image sensor closest to the roadside of the road detected by the driving environment detection process unit among a plurality of the image sensors as the standard image for use in the process of the object extraction process unit.

According thereto, the driving environment detection process unit detects the roadside of the road where the vehicle exists as the driving environment. For example, if the traffic pattern is a left-hand pattern on the traffic regulations like Japan and the road has two lanes with one lane in each direction, the positional relation of the roadside with respect to the vehicle is detected such that there is an oncoming lane to the right side of the vehicle and there is the roadside of the road to the left side of the vehicle. On the roadside of the road, generally there is a sidewalk, a side strip, or the like where pedestrians walk.

In this situation, background objects such as a building, a fence, and the like around the roadside are imaged in an area of the image including the roadside. Therefore, where the detection object is imaged in the area of the image including the roadside, it is considered that there is a higher possibility of overlap between the detection object and the background object in the image than in the case where the detection object is imaged in an area of the image including an oncoming lane.

In the case where the detection object is imaged in the area of the image including the roadside, a background object on an extension of a straight line connecting the image sensor around the roadside and the detection object is imaged overlapping the detection object as the background thereof in the image. In this situation, a straight line connecting the image sensor located near the roadside and the detection object makes a smaller angle with respect to an optical axis of the image sensor than a straight line connecting the image sensor located far from the roadside and the detection object. Therefore, a farther background object around the roadside appears in the image obtained by the image sensor near the roadside. Moreover, the farther the background object is located from the image sensor, the smaller it appears in the image, and it may not be imaged if it is too far from the image sensor to be imaged due to exceeding the possible range. Therefore, it is assumed that the image obtained by the image sensor far from the roadside is more likely to include the detection object overlapping the background object.

Accordingly, the standard image selection process unit selects anew an image obtained by the image sensor closest to the roadside of the road detected by the driving environment detection process unit among a plurality of the image sensors as a standard image for use in the process of the object extraction process unit. Thereby, the standard image is selected so as to reduce the possibility of overlap between the detection object and the background object in the standard image, by which the object extraction process unit extracts the object from the standard image accurately.

Furthermore, the vehicle surroundings monitoring apparatus according to the first aspect of the present invention, if the road where the vehicle exists has a plurality of the lanes, preferably further comprises an input device to which an occupant of the vehicle inputs information on the roadside of the road, and the driving environment detection process unit detects the roadside of the road where the vehicle exists on the basis of the information on the roadside of the road input to the input device.

According thereto, since the occupant of the vehicle inputs the information on the roadside of the road such that, for example, the traffic pattern of the road where the vehicle exists is a left-hand pattern, the driving environment detection process unit detects the positional relation of the roadside of the road where the vehicle exists with respect to the vehicle. Therefore, the standard image selection process unit can select anew the image obtained by the image sensor closest to the roadside of the road as a standard image for use in the process of the object extraction process unit.

Alternatively, in the vehicle surroundings monitoring apparatus according to the first aspect of the present invention, if the road where the vehicle exists has a plurality of the lanes, preferably the vehicle has a vehicle navigation system and the driving environment detection process unit detects the roadside of the road where the vehicle exists on the basis of the information on the roadside of the road obtained by the vehicle navigation system.

According thereto, since the information on the roadside of the road such that, for example, the traffic pattern of the road where the vehicle exists is a left-hand pattern is obtained by the vehicle navigation system, the driving environment detection process unit detects the positional relation of the roadside of the road where the vehicle exists with respect to the vehicle. Therefore, the standard image selection process unit can select anew the image obtained by the image sensor closest to the roadside of the road as a standard image for use in the process of the object extraction process unit.

Alternatively, the vehicle surroundings monitoring apparatus according to the first aspect of the present invention, if the road where the vehicle exists has a plurality of the lanes, preferably further comprises relative speed calculation process unit which calculates a relative speed of each of the objects extracted by the object extraction process unit with respect to the vehicle, and the driving environment detection process unit selects another vehicle coming from the opposite direction to that of the vehicle (another vehicle traveling in the reverse direction to that of the vehicle) out of the extracted objects on the basis of the relative speed calculated by the relative speed calculation process unit and detects the roadside of the road where the vehicle exists on the basis of the position of the selected another vehicle.

According thereto, the relative speed calculation process unit calculates the relative speed of the object extracted by the object extraction process unit with respect to the vehicle. The process of extracting the object is, for example, binarization and the extracted object includes a background object such as a building or a fence around the road besides the detection object such as a pedestrian or another vehicle around the vehicle.

In this situation, another vehicle (oncoming vehicle) coming from the opposite direction to that of the vehicle generally comes close to the vehicle at higher speed than a pedestrian or a body at rest (a building, a fence, or the like) around the road. Therefore, the driving environment detection process unit can select the oncoming vehicle out of the extracted objects on the basis of the relative speed calculated by the relative speed calculation process unit. Furthermore, since the positional relation of the oncoming lane with respect to the vehicle is known from the position of the selected oncoming vehicle, the driving environment detection process unit can detect the roadside located on the opposite side of the oncoming lane on the basis of the position of the selected oncoming vehicle. Therefore, the standard image selection process unit can select anew an image obtained by the image sensor closest to the roadside of the road as the standard image for use in the process of the object extraction process unit.

Furthermore, in the vehicle surroundings monitoring apparatus according to the first aspect of the present invention, if a plurality of the image sensors are located on the left side and the right side in the front of the vehicle, respectively, and are two image sensors which image views ahead of the vehicle, preferably the driving environment detection process unit detects a range including more things other than the objects of the left and right ranges ahead of the vehicle as the driving environment and the standard image selection process unit selects anew an image obtained by the image sensor on the side of the range detected by the driving environment detection process unit of the two image sensors as the standard image for use in the process of the object extraction process unit.

According thereto, the driving environment detection process unit detects the range including more things other than the objects of the left and right ranges ahead of the vehicle as the driving environment. If the detection object is imaged in an area corresponding to the range concerned in the image in the above, there is a high possibility of overlap between the detection object and the background object.

Moreover, if the detection object appears in the area corresponding to the range concerned in the image, a background object within the range concerned and existing on an extension of the straight line connecting the image sensor and the detection object is imaged overlapping the detection object as a background thereof. In this situation, the straight line connecting the image sensor located on the side of the range concerned (on the same side as the range concerned) and the detection object makes a smaller angle with respect to the optical axis of the image sensor than the straight line connecting the image sensor located on the opposite side to the range concerned and the detection object. Therefore, a farther background object within the range concerned appears in the image obtained by the image sensor located on the side of the range concerned. Moreover, the farther the background object is located from the image sensor, the smaller it appears in the image, and further it may not be imaged if it is too far from the image sensor to be imaged due to exceeding the possible range. Therefore, it is assumed that the image obtained by the image sensor located on the opposite side to the range concerned is more likely to include the detection object overlapping the background object.

Accordingly, the standard image selection process unit selects anew an image obtained by the image sensor on the side of the range detected by the driving environment detection process unit of the two image sensors as a standard image for use in the process of the object extraction process unit. Thereby, the standard image is selected so as to reduce the possibility of overlap between the detection object and the background object in the standard image, by which the object extraction process unit extracts the object from the standard image accurately.

For example, if the road where the vehicle exists has a plurality of lanes, it is considered that the range including more things other than objects of the left and right ranges ahead of the vehicle is a range on the side of the roadside of the road that includes a building, a fence, or the like around the road and it is also considered that the range including less things other than objects is a range on the side of the oncoming lane, almost all of which is covered with a road surface. Therefore, in this situation, the image sensor on the side of the range detected by the driving environment detection process unit of the two image sensors is an image sensor closer to the roadside.

Furthermore, the vehicle surroundings monitoring apparatus according to the first aspect of the present invention, if a plurality of the image sensors are located on the left side and the right side in the front of the vehicle, respectively, and are two image sensors which image views ahead of the vehicle, preferably further comprises an area extraction process unit which extracts an area having pixel data of a predetermined threshold value or greater in the image by binarizing the image obtained by at least one of the two image sensors, and the driving environment detection process unit determines an area including more areas extracted by the area extraction process unit out of the left and right areas in the image and detects a range on the same side as the determined area of the left and right ranges ahead of the vehicle as the range including more objects.

According thereto, the area extraction process unit extracts the area having pixel data of a predetermined threshold value or greater in the image by binarizing the image obtained by at least one of the two image sensors. It should be noted here that the extracted area is an area corresponding to an object. The object includes a background object such as a building or a fence around the road in addition to the detection object such as a pedestrian or any other vehicle around the vehicle.

In this situation, the driving environment detection process unit determines the area including more areas extracted by the area extraction process unit out of the left and right areas in the image. Since the determined area includes more objects in the image, the range ahead of the vehicle corresponding to this area is considered to be a range including more objects. Therefore, the driving environment detection process unit detects the range on the same side as the determined area of the left and right ranges ahead of the vehicle as a range including more objects, and the standard image selection process unit selects anew the image obtained by the image sensor on the same side as the detected range as a standard image for use in the process of the object extraction process unit. Thereby, the standard image is selected in such a way as to reduce the possibility of overlap between the detection object and the background object in the standard image.

Alternatively, the vehicle surroundings monitoring apparatus according to the first aspect of the present invention, if a plurality of the image sensors are located on the left side and the right side in the front of the vehicle, respectively, and are two image sensors which image views ahead of the vehicle, preferably further comprises a distance calculation process unit which calculates a distance of each of the objects extracted by the object extraction process unit with respect to the vehicle, and the driving environment detection process unit detects a range including more objects of the extracted objects within a predetermined distance from the vehicle of the left and right ranges ahead of the vehicle as the range including more objects.

According thereto, the distance calculation process unit calculates the distance of each of the objects extracted by the object extraction process unit with respect to the vehicle. The object extraction process is, for example, binarization, and the extracted objects include background objects such as a building and a fence around the road in addition to the detection objects such as a pedestrian and any other vehicle around the vehicle.

If there are a lot of the extracted objects within the predetermined distance ahead of the vehicle in this situation, it is assumed that there are a lot of background objects having a high possibility of overlapping the detection objects in the image. Therefore, the driving environment detection process unit detects a range including more extracted objects within the predetermined distance from the vehicle of the left and right ranges ahead of the vehicle as the range including more objects. The standard image selection process unit then selects anew the image obtained by the image sensor on the same side as the detected range as the standard image for use in the process of the object extraction process unit, by which the standard image is selected in such a way as to reduce the possibility of overlap between the detection object and the background object in the standard image.

On the other hand, the positional relation of the roadside with respect to the vehicle is previously known from the traffic pattern on the traffic regulations of the country where the vehicle is being driven, and therefore the image sensor closest to the roadside of the road can be preset as a predetermined image sensor. Therefore, according to a second aspect of the present invention, there is provided a vehicle surroundings monitoring apparatus which detects objects existing around a vehicle from images obtained by a plurality of image sensors mounted on the vehicle, comprising: an object extraction process unit which extracts the objects from a predetermined standard image of the images obtained by a plurality of the image sensors; and a standard image selection process unit which selects anew an image obtained by a predetermined image sensor, which is closest to the roadside of the road where the vehicle exists and having a plurality of lanes, of a plurality of the image sensors as a standard image for use in the process of the object extraction process unit.

According thereto, the standard image selection process unit selects the image obtained by the predetermined image sensor closest to the roadside of the road where the vehicle exists and having a plurality of the lanes as a standard image anew, thereby reducing the possibility of overlap between the detection object and the background object in the standard image similarly to the vehicle surroundings monitoring apparatus according to the first aspect of the present invention. Therefore, the object extraction process unit improves in the extraction accuracy of the objects in the standard image, and thus the objects are properly extracted from the standard image, so that the objects are detected accurately.

Subsequently, according to a third aspect of the present invention, there is provided a vehicle surroundings monitoring apparatus, which is provided with a computer having an interface circuit for accessing data of images obtained by a plurality of image sensors mounted on a vehicle and detects objects existing around the vehicle by arithmetic processing performed by the computer, wherein the computer performs: an object extraction process of extracting the objects from a predetermined standard image of the images obtained by a plurality of the image sensors; a driving environment detection process of detecting a driving environment of the vehicle; and a standard image selection process of selecting anew a standard image for use in the process of the object extraction process out of the images obtained by a plurality of the image sensors according to the driving environment detected in the driving environment detection process.

According to the vehicle surroundings monitoring apparatus of the third aspect of the present invention, it can produce the same effects as those described in relation to the vehicle surroundings monitoring apparatus of the first invention by performing the computer arithmetic processing.

Subsequently, according to the present invention, there is provided a vehicle surroundings monitoring method which detects objects existing around a vehicle from images obtained by a plurality of image sensors mounted on the vehicle, comprising: an object extraction step of extracting the objects from a predetermined standard image of the images obtained by a plurality of the image sensors; a driving environment detection step of detecting a driving environment of the vehicle; and a standard image selection step of selecting anew a standard image for use in the process of the object extraction step out of the images obtained by a plurality of the image sensors according to the driving environment detected in the driving environment detection step.

According to this vehicle surroundings monitoring method, the standard image selection step is performed to select the standard image out of the images obtained by a plurality of the image sensors according to the driving environment detected in the driving environment detection step, whereby it is possible to select anew an image having a low possibility of overlap between the detection object and the background object in the image, as a standard image for use in the process of the object extraction step. Therefore, the detection object separated from the background object is provided in the standard image at the time of performing the process of extracting the objects from the predetermined standard image in the object extraction step, which improves the extraction accuracy of the objects, by which the objects are properly extracted from the standard image and the objects are detected accurately.

Subsequently, according to the present invention, there is provided a vehicle surroundings monitoring program, which causes a computer to perform a process of detecting objects existing around a vehicle from images obtained by a plurality of image sensors mounted on the vehicle, having functions of causing the computer to perform: an object extraction process of extracting the objects from a predetermined standard image of the images obtained by a plurality of the image sensors; a driving environment detection process of detecting a driving environment of the vehicle; and a standard image selection process of selecting anew a standard image for use in the object extraction process out of the images obtained by a plurality of the image sensors according to the driving environment detected in the driving environment detection process.

According to the vehicle surroundings monitoring program, it is possible to cause the computer to perform a process which produces the same effects as those described in relation to the vehicle surroundings monitoring apparatus of the first invention.

BRIEF DESCRIPTION OF THE DRAWINGS

FIG. 7 is an explanatory diagram of a process of searching for a corresponding image in the object detection and warning operation shown in FIG. 3.

FIG. 8 is an explanatory diagram of a process of searching for a corresponding image in the object detection and warning operation shown in FIG. 3.

FIG. 9 is an explanatory diagram of a process of calculating a parallax in the object detection and warning operation shown in FIG. 3.

DETAILED DESCRIPTION OF THE PREFERRED EMBODIMENTS

First Embodiment

A first embodiment of the present invention will be described, first, with reference to FIG. 1 to FIG. 11. It should be noted that this embodiment corresponds to a vehicle surroundings monitoring apparatus according to the first aspect of the present invention.

Figure 1:
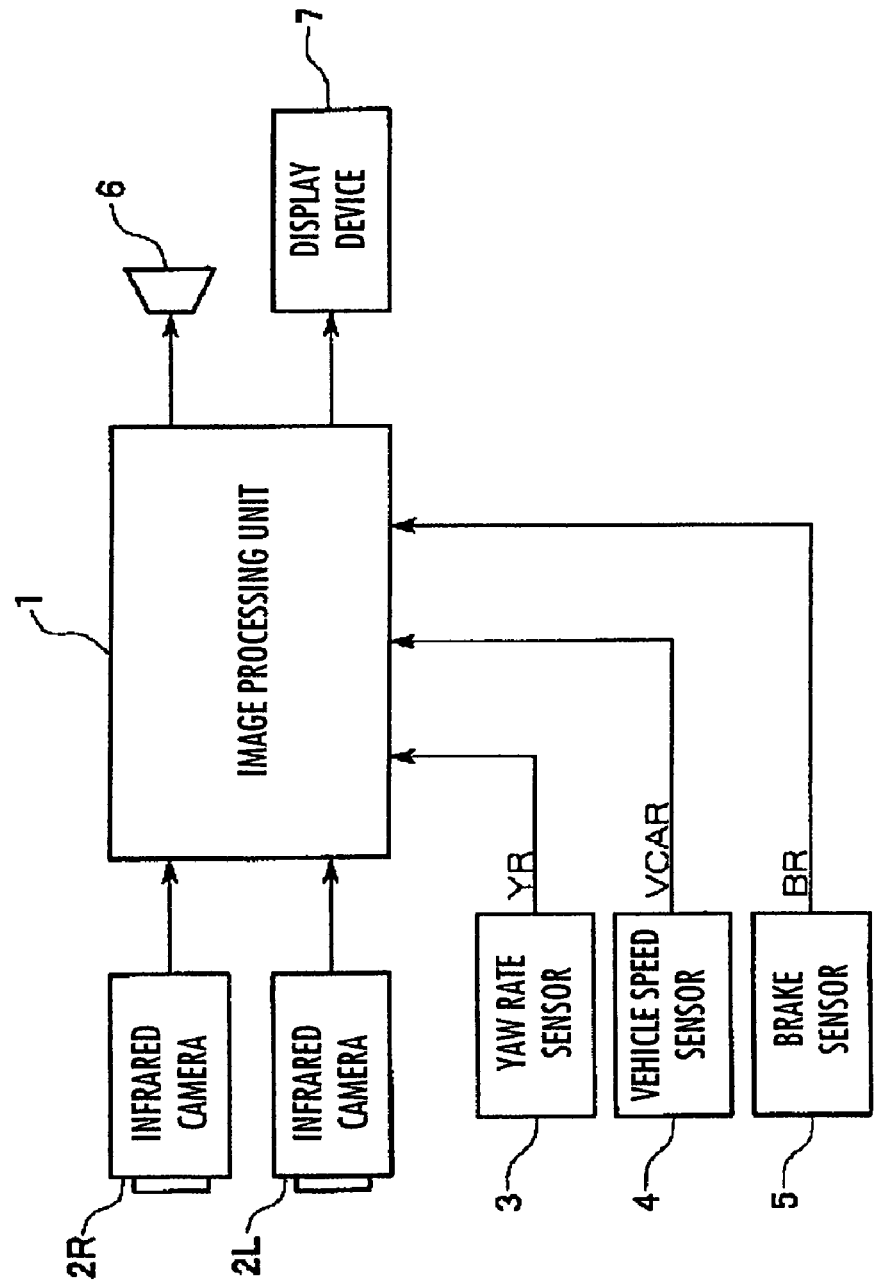
FIG. 1 is a functional block diagram of a vehicle surroundings monitoring apparatus according to a first embodiment of the present invention.
Figure 2:
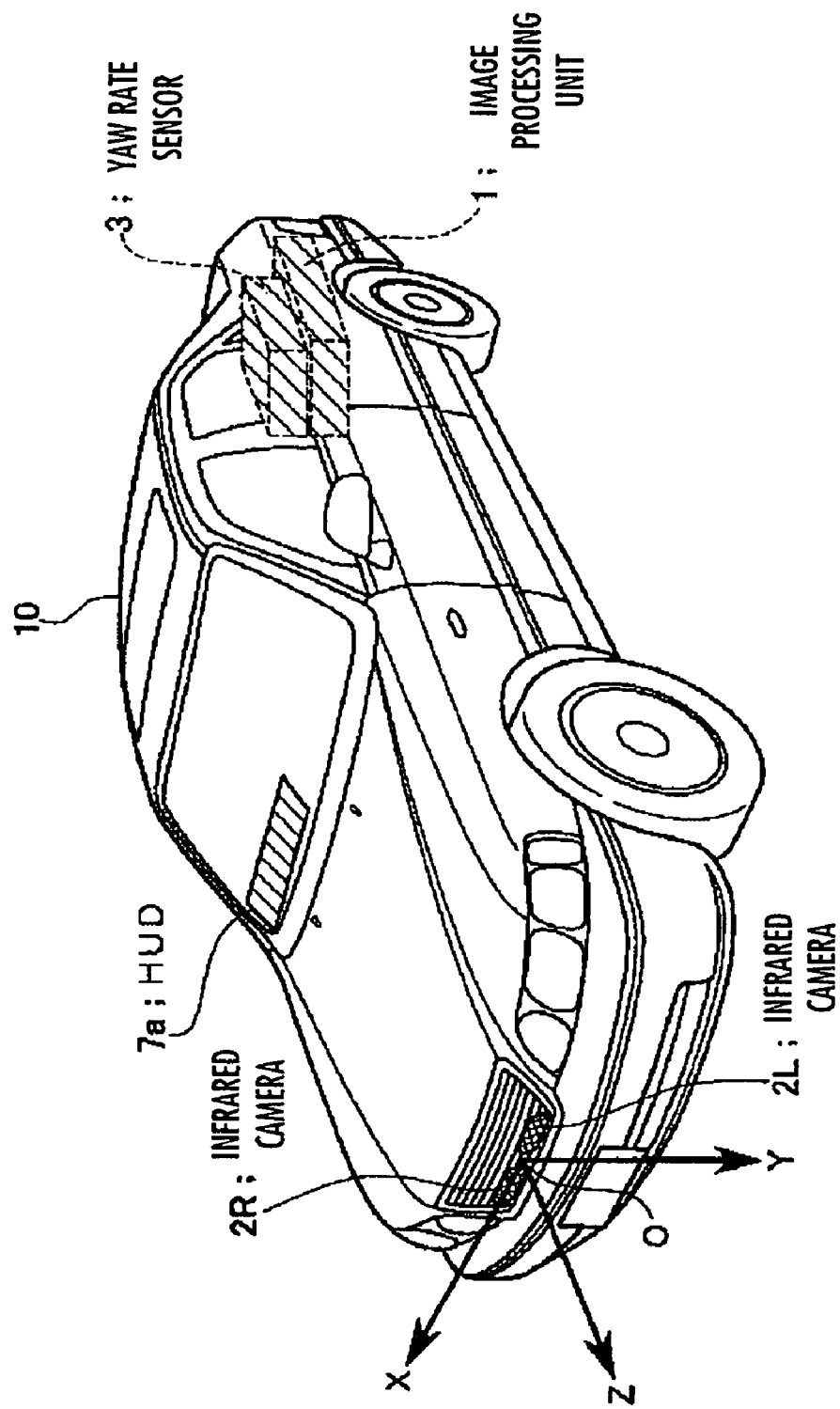
FIG. 2 is a diagram showing mounting locations of infrared cameras, sensors, a display, and the like on the vehicle shown in FIG. 1.

Referring to FIG. 1 and FIG. 2, the vehicle surroundings monitoring apparatus according to this embodiment includes an image processing unit 1, which is an electronic unit having a central processing unit (CPU) which controls the vehicle surroundings monitoring apparatus. The image processing unit 1 is connected to the following mounted on the vehicle 10: two infrared cameras 2R and 2L, a yaw rate sensor 3 which detects a yaw rate of the vehicle 10, a vehicle speed sensor 4 which detects a traveling speed (vehicle speed) of the vehicle 10, and a brake sensor 5 which detects brake operations of the vehicle 10.

Furthermore, the image processing unit 1 is connected to a loudspeaker 6 which generates a voice alarm and to an image display device 7 which displays images obtained by the infrared cameras 2R and 2L so that a driver recognizes an object at higher risk of collision, with the loudspeaker 6 and the image display device 7 disposed in the vehicle surroundings monitoring apparatus. The image display device 7 includes, for example, a meter integrated display which is integrated with a meter displaying a running condition of the vehicle 10 numerically, a navigation display placed on a console of the vehicle 10, and a head up display (HUD) 7a that displays information at a position on the front window of the vehicle 10 where the field of front vision of the driver is not impaired.

In addition, the image processing unit 1 is connected to an input device (not shown), to which an occupant of the vehicle 10 inputs information on a roadside of a road, provided in the vehicle surroundings monitoring apparatus. The information on the roadside of the road input to the input device is such that, for example, the traffic pattern on the road where the vehicle 10 exists is a left-hand pattern.

Although a detailed illustration is omitted, the image processing unit 1 includes an A/D converter which converts an input analog signal to a digital signal, an image memory which stores a digitized image signal, and a computer (an arithmetic processing circuit including a CPU, a memory, I/O circuits and the like or a microcomputer in which these functions are collected intensively) which has an interface circuit for accessing (reading and writing) data stored in the image memory so as to perform various arithmetic processing operations for the image stored in the image memory. The image processing unit 1 converts output signals from the infrared cameras 2R and 2L, the yaw rate sensor 3, the vehicle speed sensor 4, and the brake sensor 5 to digital signals and inputs them to the computer.

The infrared cameras 2R and 2L can detect far infrared rays, having a characteristic that their output signal levels become higher (the luminance increases) as the temperature of an object rises. The infrared cameras 2R and 2L correspond to a plurality of the (two in this embodiment) image sensors of the present invention.

As shown in FIG. 2, the infrared cameras 2R and 2L are located on the right side and the left side of the front part of the vehicle 10, respectively, so as to be substantially symmetric with respect to the center of the vehicle 10 in the vehicle width direction. The infrared cameras 2R and 2L are fixed to the vehicle 10 in such a way that the optical axes of the two infrared cameras 2R and 2L are parallel to each other and that both of them are at the same height from the road surface. In addition, the HUD 7a is disposed in such a way that its display screen appears at a position on the front window of the vehicle 10 where the field of front vision of the driver is not impaired.

The image processing unit 1 further includes, as functions thereof, an object extraction process unit which extracts an object from a predetermined standard image of obtained images; a position detection process unit which detects the position of the extracted object with respect to the vehicle 10; a driving environment detection process unit which detects a driving environment of the vehicle 10; and a standard image selection process unit which selects the standard image according to the detected driving environment.

These process units are configured by executing a program previously implemented in the memory of the image processing unit 1 by using the image processing unit 1. This program includes a vehicle surroundings monitoring program of the present invention. The program can be stored in the memory via a recording medium such as a CD-ROM. In addition, the program can be delivered or broadcasted from an external server over a network or a satellite and be stored in the memory after it is received from a communication device mounted on the vehicle 10.

The object extraction process unit extracts objects from the predetermined standard image of the images obtained by the infrared cameras 2R and 2L. The position detection process unit then detects the position of each of the objects with respect to the vehicle 10 on the basis of the images obtained by the infrared cameras 2R and 2L and the objects extracted by the object extraction process unit. As a specific example of an applicable technique for extracting the objects and detecting the position of each of the objects, there can be used the technique as disclosed in the above Patent Document 1.

The driving environment detection process unit detects the roadside of the road where the vehicle 10 exists as a driving environment of the vehicle 10 on the basis of the information on the roadside of the road, which has been input by the occupant of the vehicle 10 to the input device. It should be noted here that the vehicle driving environment is environmental information where the degree of possibility of overlap between the detection object and the background object can be recognized or estimated in the images obtained by the infrared cameras 2R and 2L mounted on the vehicle 10. In addition, in the description of this environment, it is assumed that a road where the vehicle 10 exists has a plurality of lanes.

The standard image selection process unit selects a standard image for use in the process of the object extraction process unit anew out of the images (grayscale images) obtained by the infrared cameras 2R and 2L according to the driving environment detected by the driving environment detection process unit. In this process, the standard image selection process unit selects, as the standard image, an image obtained by an infrared camera closest to the roadside of the road detected by the driving environment detection process unit among the infrared cameras 2R and 2L.

In this embodiment, the detection object (object as a target of detection) is a moving object that exists in the surroundings of the vehicle 10 such as, for example, a pedestrian, a large animal, and other vehicles. On the other hand, the background object (object other than the detection object) is a body at rest in the surroundings of the road where the vehicle 10 is traveling such as, for example, a building, a fence, or a utility pole existing at the side of the roadside of a road, having a possibility of overlapping the detection object as the background thereof when the detection object is imaged from the vehicle 10.

Figure 3:
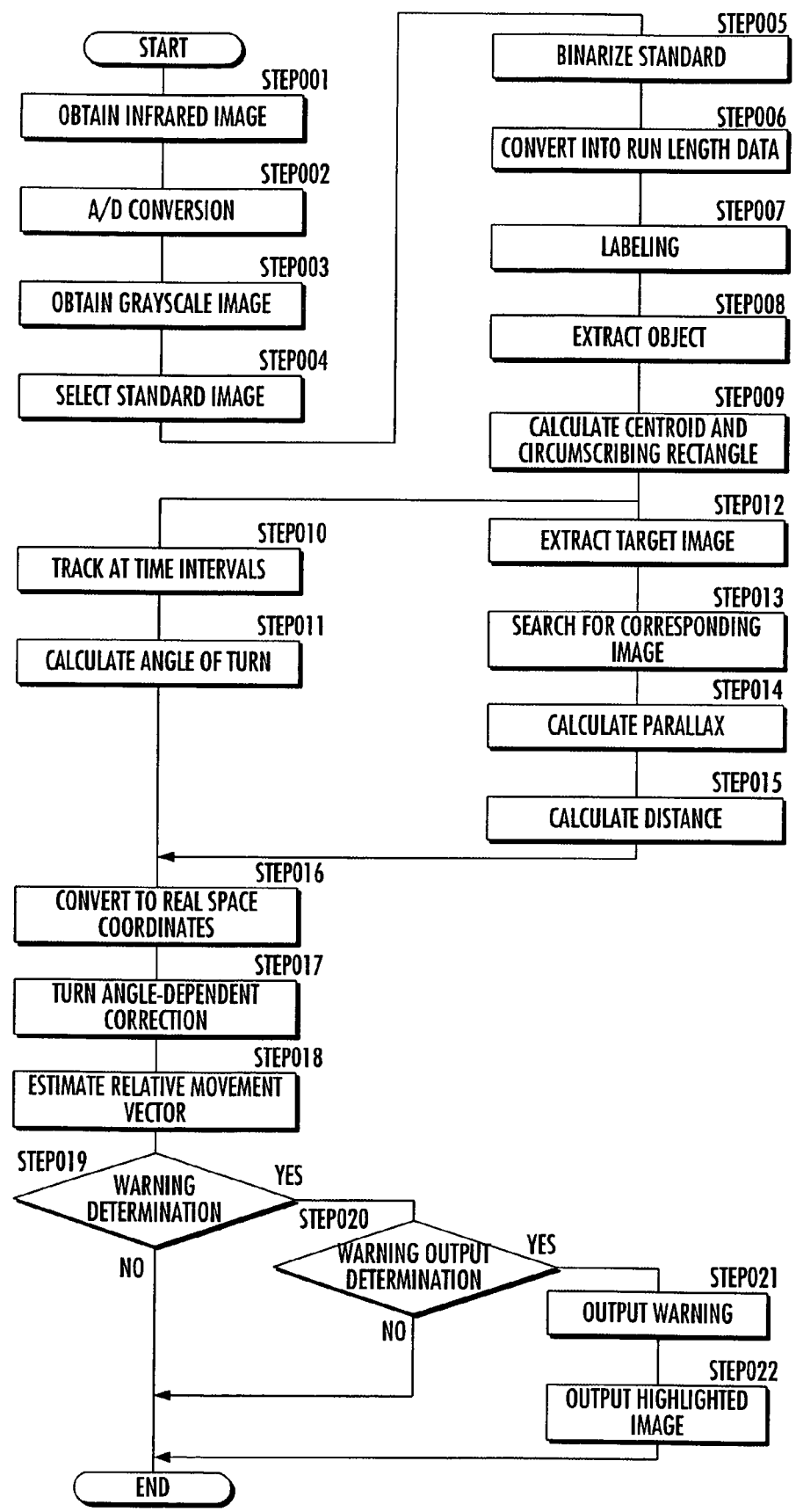
FIG. 3 is a flowchart showing an object detection and warning operation in an image processing unit of the vehicle surroundings monitoring apparatus shown in FIG. 1.

Subsequently, the general operation (object detection and warning operation) of the vehicle surroundings monitoring apparatus according to this embodiment will be described with reference to the flowchart shown in FIG. 3. Referring to FIG. 3, first, the image processing unit 1 obtains infrared images as output signals of the infrared cameras 2R and 2L (step 001), converts them through A/D conversion (step 002), and stores the grayscale images in the image memory (step 003). It should be noted that a right image is obtained by the infrared camera 2R and a left image is obtained by the infrared camera 2L.

Figure 4A:
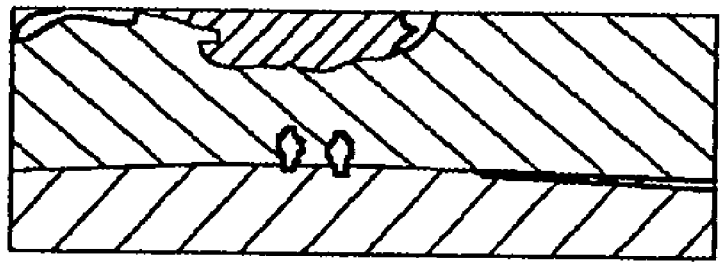
FIG. 4 is an illustration of images obtained in the object detection and warning operation shown in FIG. 3.
Figure 4B:
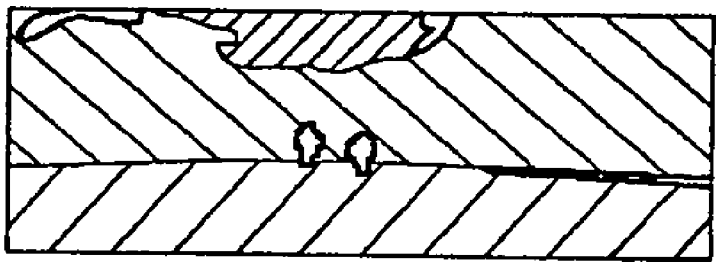

FIG. 4(a) and FIG. 4(b) are diagrams for schematically explaining the right image and the left image obtained by the infrared cameras 2R and 2L, respectively. In FIG. 4(a) and FIG. 4(b), a hatched area is a halftone (gray) area, and an area enclosed by a thick solid line is an object area having a higher luminance level (high temperature) and displayed as a white area on the screen (hereinafter, referred to as "high-luminance area"). As shown, the horizontal position on the display screen of the same object is different between the right image and the left image. Therefore, the distance up to the object can be calculated by the difference (parallax).

Subsequently, a standard image is selected out of the right image and the left image (step 004). The details of this process will be described later.

Figure 5:
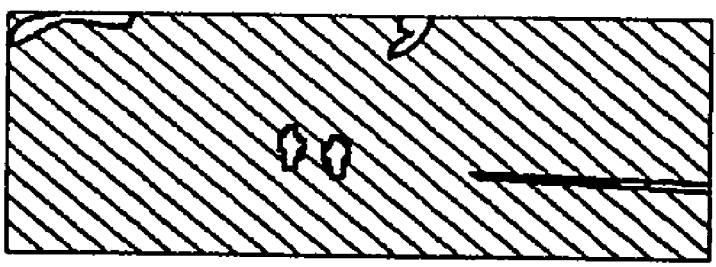
FIG. 5 is an illustration of a binary image in the object detection and warning operation shown in FIG. 3.

Subsequently, the image processing unit 1 binarizes the image signal of the standard image (step 005). More specifically, it sets a value of "1" (white) if the luminance value of an area is a threshold value Ith or higher and sets "0" (black) otherwise for the image signal of the standard image. The threshold value Ith is previously determined on an experimental basis. FIG. 5 shows an image obtained by binarization of the image shown in FIG. 4(a). In FIG. 5, a hatched area represents a black area, while high-luminance areas enclosed by thick solid lines represent white areas.

Subsequently, the image processing unit 1 converts the binarized image data to run length data (step 006). Run length data lines each indicate the high-luminance area set to white by the binarization by means of one-dimensional connected pixels. The lines each have a width of one pixel in the y direction (vertical direction) and have a length of pixels constituting the run length data in the x direction (horizontal direction).

Figure 6:
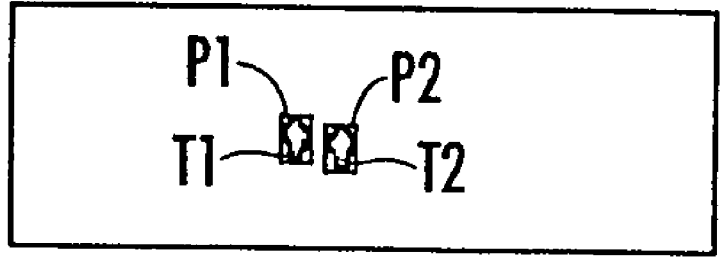
FIG. 6 is an illustration of an object extraction image in the object detection and warning operation shown in FIG. 3.

Subsequently, the image processing unit 1 extracts an object by labeling the same (step 007) from the image data converted to the run length data (step 008). In other words, out of the lines converted to the run length data, the lines overlapping in the y direction are regarded as one object, whereby the connected areas in the image are grasped as the object. For example, as shown in FIG. 6, the high-luminance areas shown in FIG. 4(a) are grasped as objects (binary objects) T1 and T2 enclosed by frames P1 and P2, respectively.

The image processing unit 1 then calculates the centroid G and area S of the extracted object and the aspect ratio ASPECT of the rectangle circumscribing the extracted object (step 009). Assuming here that the run length data of the object of label A is (x[i], y[i], run[i], A) (i=0, 1, 2, - - - , N−1), the image processing unit 1 calculates the area S of the object A by integrating the lengths (run[i]−1) of the run length data of an identical object (N run length data). The coordinates of the centroid G of the object A are each calculated by multiplying the length (run[i]−1) of each run length data by the coordinate x[i] or y[i] of the center of the run length data, integrating the lengths (run[i]−1) of the run length data of identical object (N run length data), and then dividing the result of integration by the area S. The aspect ratio ASPECT is calculated as Dy/Dx which is a ratio of length Dy in the vertical direction to length Dx in the horizontal direction of the rectangle circumscribing the object. It should be noted that the coordinate of the centroid of the rectangle circumscribing the object may be used in place of that of the centroid G.

Subsequently, the image processing unit 1 tracks at time intervals of the object, that is, recognizes identical objects for each sampling period (step 010). In the tracking at time intervals, assuming that k is a time obtained by discretizing time t as an analog amount by a sampling period, for example, objects A and B are extracted at time k and then they are determined as to their identity with objects C and D extracted at time (k+1). The identity is determined based on the centroid G and area S of the object and the aspect ratio ASPECT. If the objects A and B are determined to be identical with the objects C and D, respectively, the objects C and D are changed in labels to the objects A and B to thereby track the objects at time intervals (to thereby recognize the identical objects). The position coordinates of (the centroid of) the recognized objects are stored as time-series position data into the memory and used for later arithmetic processing.

It should be noted that the processes in steps 005 to 010 described above are performed for the binary standard image.

The image processing unit 1 then reads the vehicle speed VCAR detected by the vehicle speed sensor 4 and the yaw rate YR detected by the yaw rate sensor 3 and integrates the yaw rate YR over time to calculate the angle θr of turn of the vehicle 10 (step 011).

On the other hand, in steps 012 to 015, a distance z between the object and the vehicle 10 is calculated in parallel with the processes of steps 010 and 011. This calculation requires a longer time period than the processes of steps 010 and 011, and hence it is executed in a longer period than that of the processes of steps 010 and 011 (for example, approximately three times as long as a period of execution of the processes of steps 001 to 011).

First, the image processing unit 1 extracts a target image R1 (the entire area enclosed by the circumscribing rectangle is assumed to be a target image here) from the standard image as shown in FIG. 7(*a*) by selecting one of the objects tracked by the binary images of the standard image (step 012).

Next, the image processing unit 1 sets a search area for searching an image (hereinafter referred to as the "corresponding image") corresponding to the target image R1 within the reference image (the image other than the standard image out of the right image and the left image obtained by the infrared cameras 2R and 2L) and extracts the corresponding image by performing a correlation operation (step 013). More specifically, the image processing unit 1 sets a search area R2 within the reference image as shown in FIG. 7(*b*) based on the coordinates of each vertex of the target image R1 and calculates the total sum value C(a, b) of luminance differences indicative of a degree of correlation with the target image R1 within the search area R2 by using the following equation (1) so as to extract an area which provides the minimum value of the total sum value C(a, b).

[Eq. 1]

$$C(a, b) = \sum_{n=0}^{N-1}\sum_{m=0}^{M-1} |IL(a + m - M, b + n - N) - IR(m, n)| \quad (1)$$

where IR(m, n) is a luminance value of a position shown by coordinates (m, n) in the target image R1 shown in FIG. 8, and IL(a+m−M, b+n−N) is a luminance value of a position shown by coordinates (m, n) in a local area R3 having the same shape as that of the target image R1 with a reference point set to coordinates (a, b) in the search area R2 shown in FIG. 8. A position minimizing the total sum value C(a, b) of the luminance differences is obtained by changing the coordinates (a, b) of the reference point, whereby the position of the corresponding image can be determined.

A grayscale image is used, instead of binary image, for the correlation operation. If there is past position data of the identical object, the image processing unit 1 sets an area R2*a* (indicated by a dashed line in FIG. 7(*b*)) narrower than the search area R2 as a search area on the basis of the position data. As a result of the processes of steps 012 to 013, a target image R1 in the standard image as shown in FIG. 9(*a*) and a corresponding image R4 in the reference image as shown in FIG. 9(*b*) are extracted.

Subsequently, the image processing unit 1 calculates a parallax Δd (the number of pixels) based on the position of the centroid of the target image R1 and the position of the centroid of the corresponding image R4 (step 014). More specifically, as shown in FIG. 9(*a*), a distance dR (the number of pixels) between the position of the centroid of the target image R1 and a center line LCTR of the image is calculated. In addition, as shown in FIG. 9(*b*), a distance dL (the number of pixels) between the position of the centroid of the corresponding image R4 and a center line LCTR of the image is calculated. Then, the parallax Δd is calculated by using an equation Δd=dL+dR.

Subsequently, the image processing unit 1 applies the calculated parallax Δd to the following equation (2) to calculate a distance z between the vehicle 10 and the object (step 015):

[Eq. 2]

$$z = \frac{B \times f}{\Delta d \times p} \quad (2)$$

where B is the base length, that is, a horizontal distance (in the X direction) between the center position of an imaging element of the infrared camera 2R and the center position of an imaging element of the infrared camera 2L (a distance between the optical axes of the respective cameras); f is the focal distance of lenses of the infrared cameras 2R and 2L; and p is a space interval between pixels in the imaging elements of the infrared cameras 2R and 2L.

After completion of the calculation of the angle of turn θr in step 011 and the calculation of the distance z between the object and the vehicle 10 in step 015, the image processing unit 1 converts the coordinates (x, y) and the distance z in the image to real space coordinates (X, Y, Z) (step 016). Here, the coordinate system of the real space coordinates (X, Y, Z) is defined as shown in FIG. 2 with the position of a midpoint (position fixed on the vehicle 10) of mounting positions at which the infrared cameras 2R and 2L are mounted being set to an origin O of the real space coordinate system, and coordinates in a coordinate system of an image is defined with the center of the image being set to the origin of the coordinate system, the horizontal direction being defined as the x direction, and the vertical direction being defined as the y direction.

Subsequently, the image processing unit 1 performs a turn angle-dependent correction to correct positional displacement on the image due to turning of the vehicle 10 (step 017). The turn angle-dependent correction is carried out to correct the displacement of the image since the range of the image is displaced by Δx in the x direction on the image obtained by the camera, for example, if the vehicle 10 turns to the left by the angle of turn θr during the period from time k to time (k+1). It should be noted that the coordinates after the turn angle-dependent correction are represented by (X, Y, Z) in the description below.

Then, the image processing unit 1 determines the approximate value LMV corresponding to a relative movement vector between an identical object and the vehicle 10 based on N (for example, N=10 or close to 10) real space position data, that is, time series data after the turn angle-dependent correction, which were obtained during a monitoring time period ΔT (step 018). Thereafter, the image processing unit 1 corrects the latest position coordinates P(0)=(X(0), Y(0), Z(0)) and the position coordinates P(N−1)=(X(N−), Y(N−1), Z(N−1)) obtained an (N−1) sampling period earlier (the time period ΔT earlier) to the positions on the approximate straight line LMV and determines the corrected position coordinates Pv(0)=(Xv(0), Yv(0), Zv(0)) and Pv(N−1)=(Xv(N−1), Yv(N−1), Zv(N−1)). Thereby, the relative movement vector is obtained as a vector from the position coordinates Pv(N−1) toward Pv(0).

Subsequently, the image processing unit 1 performs a warning determination process for determining whether there is a possibility of collision against the detected object (step 019). The warning determination process is performed to determine the possibility of collision between the vehicle 10 and the detected object through a collision determination process, a determination process for determining whether the detected object is within a close object determination area, and an approaching object collision determination process, which will be described hereinbelow. The determination process for determining whether the detected object is within the close object determination area is performed if it is determined that there is a possibility of collision between the vehicle 10 and the detected object in the collision determination process. Furthermore, the approaching object collision determination process is performed if it is determined that there is no possibility of collision between the vehicle 10 and the detected object in the determination process for determining whether the detected object is within the close object determination area.

First, the collision determination process is performed to calculate a relative speed Vs in the Z direction between the object and the vehicle 10 and to determine whether there is a possibility of collision therebetween within a time T to collision assuming that they are moving with the relative speed Vs maintained. It should be noted that the time T to collision intends to determine whether there is a possibility of collision the time T earlier than the predicted collision time.

Furthermore, the determination process for determining whether the object is within the close object determination area is performed to determine whether the object, in an area AR0 that can be monitored by the infrared cameras 2R and 2L, exists in an area AR1 corresponding to a range including the width a of the vehicle 10 and allowances β provided on both sides of the vehicle 10, in other words, a close object determination area AR1 at extremely high risk of collision against the vehicle 10 if the object continues to exist.

Furthermore, areas AR2 and AR3 each having X coordinates with larger absolute values than those of X coordinates in the above close object determination area AR1 (areas laterally outward of the close object determination area) are referred to as approaching object determination area. The approaching object collision determination process is performed to determine whether an object in one of these areas AR2 and AR3 enters the close object determination area AR1 by moving and comes into collision with the vehicle 10.

If it is determined that there is no possibility of collision between the vehicle 10 and the detected object in step 019 (NO as a determination result of step 019), the image processing unit 1 terminates the warning determination process and returns to step 001 to repeat the above processes.

If it is determined that there is a possibility of collision between the vehicle 10 and the detected object in step 019 (YES as a determination result of step 019), the image processing unit 1 proceeds to step 020, where the image processing unit 1 determines whether the driver of the vehicle 10 is carrying out a brake operation on the basis of an output BR of the brake sensor 5 to thereby determine whether to perform a warning output determination process, that is, whether warning should be issued.

If it is determined that the driver of the vehicle 10 is carrying out the brake operation in step 020, the image processing unit 1 calculates acceleration Gs (positive in the decelerating direction) generated by the brake operation. If the acceleration Gs is larger than a predetermined threshold value Gth, the image processing unit 1 determines that the collision is prevented by the brake operation, by which the determination result of step 020 is NO (the warning is not issued). Thus, the image processing unit 1 terminates the warning output determination process and returns to step 001 to repeat the above processes. It should be noted that the predetermined threshold value Gth corresponds to a condition for stopping the vehicle 10 in a travel distance equal to or less than the distance Zv(0) between the object and the vehicle 10 if the acceleration Gs under the brake operation is maintained without change.

On the other hand, if the acceleration Gs is equal to or less than the predetermined threshold value Gth in a situation where the driver of the vehicle 10 is carrying out the brake operation in step 020 or if the driver of vehicle 10 is not carrying out the brake operation, the determination result of step 020 is YES (the warning is issued). Since the vehicle 10 is at high possibility of touching the object, proceeding to step 021, the image processing unit 1 generates a voice alarm using the loudspeaker 6. Thereafter, proceeding to step 022, the image processing unit 1 outputs the image obtained by, for example, the infrared camera 2L to the image display device 7 and shows the image with the object coming close to the vehicle 10 highlighted to the driver of the vehicle 10.

In this embodiment, as described above, the image processing unit 1 includes the driving environment detection process unit, the standard image selection process unit, the object extraction process unit, and the position detection process unit as its functions. More specifically, step 004 in FIG. 3 corresponds to the driving environment detection process unit and the standard image selection process unit; steps 005 to 008 in FIG. 3 correspond to the object extraction process unit; and steps 009 to 017 in FIG. 3 correspond to the position detection process unit.

In addition, step 004 in FIG. 3 corresponds to the driving environment detection step and the standard image selection step in the vehicle surroundings monitoring method according to the present invention. Steps 005 to 008 in FIG. 3 corresponds to the object extraction step in the vehicle surroundings monitoring method according to the present invention.

The above is the object detection and warning operation in the image processing unit 1 of the vehicle surroundings monitoring apparatus according to this embodiment. Thereby, the object such as a pedestrian or an animal ahead of the vehicle 10 is detected based on the infrared images of the surroundings of the vehicle 10 and the signal indicating the running condition of the vehicle 10 and then the warning is issued when it is determined that the vehicle 10 is at high risk of collision.

Subsequently, the process of selecting the standard image in step 004 of the flowchart shown in FIG. 3 will be described in detail below.

First, the driving environment detection process unit of the image processing unit 1 reads information on the roadside input to the input device by the occupant of the vehicle 10. Thereby, it reads information such that, for example, the traffic pattern on the road where the vehicle 10 exists is a left-hand pattern. Subsequently, the driving environment detection process unit detects a positional relation of the roadside with respect to the vehicle 10 as a driving environment. For example, if the traffic pattern on the road where the vehicle 10 is traveling is the left-hand pattern, it is detected that there is a roadside to the left side of the vehicle 10. This driving environment is used to estimate the distribution of the background objects around the vehicle 10.

Subsequently, the standard image selection process unit of the image processing unit 1 selects the standard image according to the driving environment. In this condition, there is the roadside to the left side of the vehicle 10 and therefore the infrared camera 2L located on the left side of the vehicle 10 is closest to the roadside among the infrared cameras 2R and 2L. Therefore, the left image obtained by the infrared camera 2L is selected as the standard image.

Figure 10:
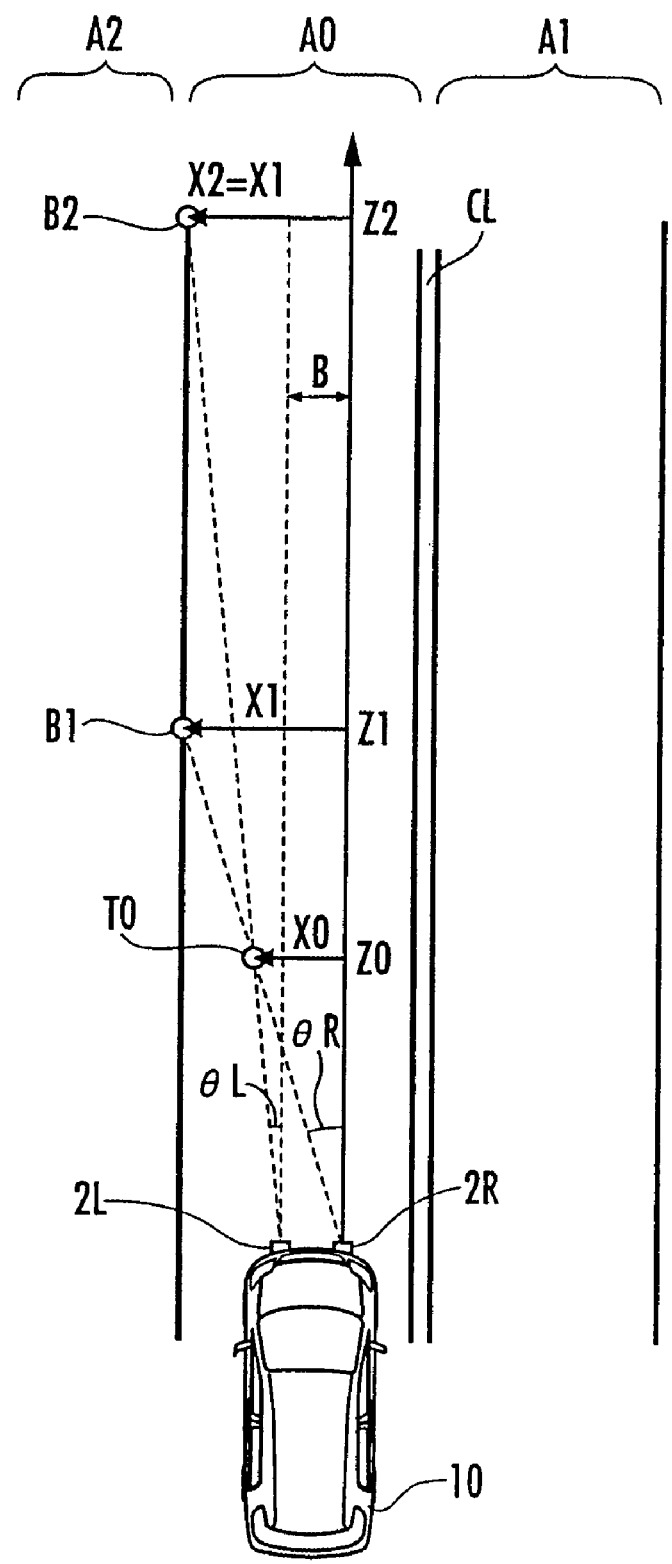
FIG. 10 is an explanatory diagram of a process of selecting a standard image in the object detection and warning operation shown in FIG. 3.

Then, the process of selecting the standard image will be described with reference to FIG. 10. FIG. 10 schematically shows the vehicle 10 and the road therearound, viewed from the above of the vehicle 10. Referring to FIG. 10, the vehicle 10 is traveling in a direction indicated by an arrow on a traffic lane A0. An area exceeding a center line CL to the right side of the vehicle 10 is an oncoming lane A1 and an area to the left side of the vehicle 10 corresponds to a roadside A2. The infrared cameras 2R and 2L are located in the front of the vehicle 10. A detection object T0 exists ahead of the vehicle 10 and background objects B1 and B2 exist on the roadside A2.

In FIG. 10, the real space coordinates are taken in the same manner as in FIG. 2, with (X0, Z0) as the distances in the X-axis direction and in the Z-axis direction from the infrared camera 2R of the detection object T0; (X1, Z1) as the distances in the X-axis direction and in the Z-axis direction from the infrared camera 2R of the background object B1; and (X2=X1, Z2) as the distances in the X-axis direction and in the Z-axis direction from the infrared camera 2R of the background object B2. B designates the base length, that is, a horizontal distance (in the X direction) between the center position of the imaging element of the infrared camera 2R and the center position of the imaging element of the infrared camera 2L (a distance between the optical axes of the respective cameras). In the example of FIG. 10, the relation X1>X0>B is fulfilled.

In FIG. 10, if the detection object T0 is imaged by the infrared camera 2R, the background object B1 on the roadside A2 existing on an extension of a straight line connecting the infrared camera 2R and the detection object T0 is imaged as a background of the detection object T0 in the obtained image (right image). The condition that the detection object T0 and the background object B1 overlap each other is X0:X1=Z0:Z1. In addition, if the detection object T0 is imaged by the infrared camera 2L, the background object B2 on the roadside A2 existing on the extension of the straight line connecting the infrared camera 2L and the detection object T0 is imaged as a background of the detection object T0 in the obtained image (left image). The condition that the detection object T0 and the background object B2 overlap each other is X0-B:X1-B=Z0:Z2.

In this situation, the angle $\theta L$ between the straight line connecting the infrared camera 2L and the detection object T0 and the Z axis is smaller than the angle $\theta R$ between the straight line connecting the infrared camera 2R and the detection object T0 and the Z axis. Therefore, as shown in FIG. 10, the background object B2 is always farther than the background object B1 from the vehicle 10. In other words, the relation Z2−Z1>1 is always satisfied. Moreover, the far background object B2 is imaged as a smaller object in the image and the far background object B2 hardly appears in the image due to attenuation of infrared radiation from the object according to the distance. Therefore, the near background object B1 is more likely to overlap the detection object T0 in the image. Therefore, it is possible to reduce the possibility of overlap between the detection object T0 and the background object in the standard image by selecting the left image obtained by the infrared camera 2L which is near the roadside as a standard image.

Figure 11A:
FIG. 11 is an explanatory diagram of a process of selecting a standard image in the object detection and warning operation shown in FIG. 3.
Figure 11B:
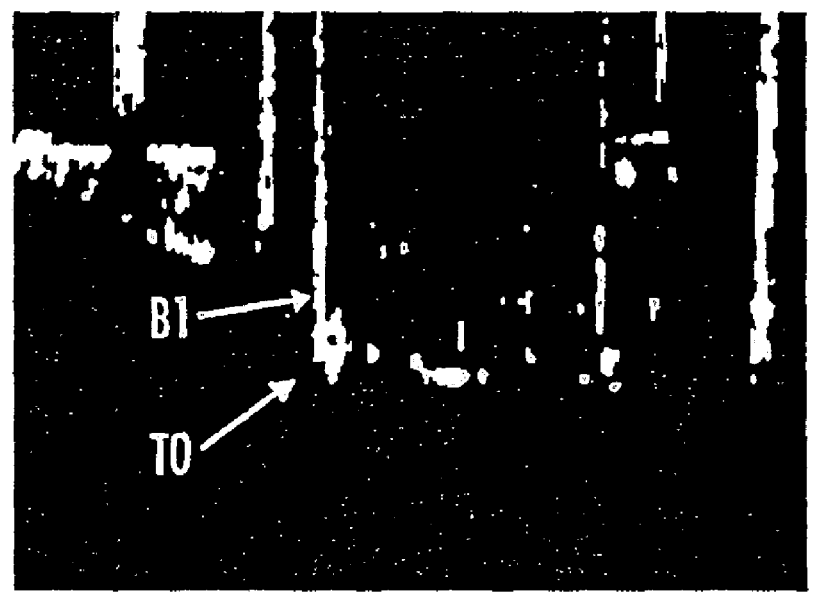

Furthermore, by selecting the standard image in this manner, the detection accuracy of the object can be improved when the object is extracted from the standard image in steps 005 to 008. For example, where the detection object T0 exists ahead of the vehicle 10 and the background objects B1 and B2 exist on the roadside A2 as shown in FIG. 10, FIGS. 11(a) and 11(b) show images obtained by binarization (step 005) of the images taken by the infrared cameras 2R and 2L. FIG. 11(a) illustrates a binarized image from the left image obtained by the infrared camera 2L and FIG. 11(b) illustrates a binarized image from the right image obtained by the infrared camera 2R.

The images illustrated in FIGS. 11(a) and 11(b) include the detection object T0 (pedestrian) and the background object B1 (utility pole) extracted as high-luminance areas, respectively. On the other hand, the background object B2 is far from the vehicle 10 and lower in luminance than the detection object T0 and the background object B1, and therefore it is not extracted as a high-luminance area in the binarization. In this condition, the detection object T0 overlaps the background object B1 in FIG. 11(b), and therefore the detection object T0 cannot be extracted separately. The detection object T0, however, can be extracted separately in FIG. 11(a). Accordingly, the detection object T0 is extracted accurately by extracting the object from FIG. 11(a) (steps 006 to 008).

The above processes reduce the possibility of overlap between the detection object and the background object in the standard image when detecting the object around the vehicle 10 from the images obtained by the infrared cameras 2R and 2L. This improves the extraction accuracy of the object in the standard image, which leads to a proper search for the corresponding object and a proper calculation of a parallax, by which the position of the object is detected accurately.

In this embodiment, an input device is provided and it is assumed that the driving environment detection process unit detects the driving environment based on information input to the input device and that standard image selection process unit selects the standard image based on the driving environment detected by the driving environment detection process unit. On the other hand, since the positional relation of the roadside with respect to the vehicle 10 is previously known from the traffic pattern on the traffic regulations of the country where the vehicle 10 is being driven, the infrared camera closest to the roadside of the road can be preset as a predetermined infrared camera. Therefore, as another embodiment, the standard image selection process unit can be adapted to select an image obtained by the predetermined infrared camera closest to the roadside of the road where the vehicle 10 exists as a standard image, without providing the input device (corresponds to the vehicle surroundings monitoring apparatus according to the second aspect of the present invention).

Furthermore, in this embodiment, the image processing unit 1 includes the position detection process unit as a function thereof and it detects the position of the object around the vehicle 10 based on the object extracted by the object extraction process unit and issues warning when it is determined that the vehicle 10 is at high risk of collision. In another embodiment, however, the position detection process unit can be omitted and, for example, the standard image can be output to the image display device 7 to be shown with the extracted object highlighted to the driver of the vehicle 10. Also in this situation, a pedestrian or other object around the vehicle 10 can be properly highlighted, so that the driver can recognize the object due to the improvement of the extraction accuracy of the object.

Second Embodiment

The following describes a second embodiment of the present invention. This embodiment is the same as the first embodiment except that the vehicle 10 is provided with a navigation system, instead of the input device. In the description below, the same reference numerals designate the same components as in the first embodiment and their description is omitted here.

In this embodiment, the image processing unit 1 is connected to the navigation system mounted on the vehicle 10. The driving environment detection process unit as a function of the image processing unit 1 detects a roadside of a road where the vehicle 10 exists as a driving environment based on information on the roadside of the road obtained by the navigation system. The information on the roadside of the road obtained by the navigation system is information such that, for example, the traffic pattern on the road where the vehicle 10 exists is a left-hand pattern. Similarly to the first embodiment, it is assumed that the road where the vehicle 10 exists has a plurality of lanes. Other features of this embodiment are the same as those of the first embodiment.

Now, the description will be given to the entire operation (the object detection and warning operation) of the vehicle surroundings monitoring apparatus according to this embodiment. The object detection and warning operation in this embodiment differs from the first embodiment only in the process of detecting the driving environment in the process of selecting the standard image (step 004 in FIG. 3). The flowchart of the object detection and warning operation in this embodiment is the same as in FIG. 3. Therefore, the following description will be made with reference to the flowchart shown in FIG. 3.

Referring to FIG. 3, in step 004 of this embodiment, the driving environment detection process unit of the image processing unit 1 obtains information on the roadside using the navigation system, first. Thereby, for example, it obtains information such that, for example, the traffic pattern on the road where the vehicle 10 exists is a left-hand pattern. Subsequently, the driving environment detection process unit detects the positional relation of the roadside with respect to the vehicle 10 as a driving environment. For example, if the traffic pattern on the road where the vehicle 10 exists is a left-hand pattern, it is detected that there is a roadside to the left side of the vehicle 10. The distribution of the background objects around the vehicle 10 is estimated based on the driving environment. The operations other than those in the above description are the same as in the first embodiment.

According to this embodiment, it is possible to reduce the possibility of overlap between the detection object and the background object in the standard image when detecting the object around the vehicle 10 from the images obtained by the infrared cameras 2R and 2L similarly to the first embodiment. This improves the extraction accuracy of the object in the standard image, which leads to a proper search for the corresponding object and a proper calculation of a parallax, by which the position of the object is detected accurately.

Third Embodiment

The following describes a third embodiment of the present invention. This embodiment is the same as the first embodiment except that the image processing unit 1 includes a relative speed calculation process unit as its function, instead of the input device. In the description below, the same reference numerals designate the same components as in the first embodiment and their description is omitted here.

In the vehicle surroundings monitoring apparatus according to this embodiment, the image processing unit 1 includes, as a function thereof, the relative speed calculation process unit which calculates the relative speed of an object extracted by the object extraction process unit with respect to the vehicle 10. The relative speed calculation process unit calculates the relative speed of the extracted object with respect to the vehicle 10, for example, by using the position of the object extracted by the object extraction process unit, which has been detected by the position detection process unit.

Thereafter, the driving environment detection process unit selects another vehicle coming from the opposite direction to the vehicle 10 out of the extracted objects based on the relative speed calculated by the relative speed calculation process unit and detects the roadside of the road where the vehicle 10 exists based on the position of the selected vehicle. It should be noted that the road where the vehicle 10 exists is assumed to have a plurality of lanes similarly to the first embodiment. Features other than those in the above description are the same as in the first embodiment.

Now, the description will be given to the entire operation (the object detection and warning operation) of the vehicle surroundings monitoring apparatus according to this embodiment. A surroundings monitoring process in this embodiment differs from the first embodiment only in the process of detecting a driving environment in the process of detecting the driving environment in the process of selecting the standard image (step 004 in FIG. 3). The flowchart of the object detection and warning operation in this embodiment is the same as in FIG. 3. Therefore, the following description will be made with reference to the flowchart shown in FIG. 3.

Referring to FIG. 3, in step 004 of this embodiment, first, processes of extracting an object is performed for a predetermined standard image of the images obtained by the infrared cameras 2R and 2L. More specifically, the same processes as those of steps 005 to 008 are performed for the predetermined standard image and thereby the object is extracted. This operation corresponds to the object extraction process unit according to the present invention similarly to the processes of steps 005 to 008. As the predetermined standard image in step 004, an image obtained by a predetermined infrared camera (for example, the infrared camera 2R) (right image) may be used, for example. Alternatively, the predetermined standard image used in step 004 may be, for example, an image obtained by the same infrared camera as one for the standard image selected by the standard image selection process unit in the process in the previous sampling period.

Subsequently, the relative speed calculation process unit calculates the relative speed of the extracted object with respect to the vehicle 10. More specifically, the same processes as those of steps 009 to 017 are performed for the extracted object and thereby the position (real space position data) of the object is detected. This operation corresponds to the position detection process unit according to the present invention similarly to the processes of steps 009 to 017. Thereafter, the distance of the extracted object from the vehicle 10 is calculated by using the detection result and the relative speed of the extracted object with respect to the vehicle 10 is calculated based on the distance calculated for each sampling period.

Subsequently, the driving environment detection process unit selects another vehicle (oncoming vehicle) coming from the opposite direction to that of the vehicle 10 out of the extracted objects based on the relative speed calculated by the relative speed calculation process unit. More specifically, it selects, as an oncoming vehicle, an object moving at a relative speed in the direction in which the object comes close to the vehicle 10 and at a relative speed equal to or higher than a predetermined value. Thereafter, the driving environment detection process unit detects the positional relation of the roadside with respect to the vehicle 10 as a driving environment based on the position of the selected oncoming vehicle. For example, if the selected oncoming vehicle is traveling to the right side of the vehicle 10, it is detected that there is a roadside to the opposite side or the left side of the vehicle 10. The distribution of the background objects around the vehicle 10 is estimated based on the driving environment.

Thereafter, the standard image selection process unit selects anew a standard image for use in the processes (processes of steps 005 to 008) of the object extraction process unit according to the above driving environment. In this embodiment, the processes of steps 005 to 017 can be omitted if the standard image used for the processes of the object extraction process unit is the same as the standard image selected anew by the standard image selection process unit in step 004, and processes in step 018 and subsequent steps can be performed by using the position (real space position data) of the object extracted by the object extraction process unit in step 004, which has been detected by the position detection process unit. The operations other than those in the above description are the same as in the first embodiment.

According to this embodiment, it is possible to reduce the possibility of overlap between the detection object and the background object in the standard image when detecting the object around the vehicle 10 from the images obtained by the infrared cameras 2R and 2L in the same manner as in the first embodiment. This improves the extraction accuracy of the object in the standard image, which leads to a proper search for the corresponding object and a proper calculation of a parallax, by which the position of the object is detected accurately.

While the relative speed calculation process unit calculates the relative speed of the object with respect to the vehicle 10 by using the detection result obtained by the position detection process unit in this embodiment, in another embodiment the relative speed calculation process unit can calculate the relative speed of the object with respect to the vehicle 10 on the basis of the images obtained by the infrared cameras 2R and 2L and the objects extracted by the object extraction process unit without using the detection result obtained by the position detection process unit. Furthermore, the relative speed calculation process unit can calculate the relative speed of the object with respect to the vehicle 10 by using the positional information of the object detected by a millimeter wave radar or other sensors instead of the images obtained by the infrared cameras 2R and 2L.

Fourth Embodiment

Figure 12:
FIG. 12 is an explanatory diagram of a process of detecting a driving environment in a vehicle surroundings monitoring apparatus according to a fourth embodiment of the present invention.

The following describes a fourth embodiment of the present invention with reference to FIG. 12. This embodiment is the same as the first embodiment except that the image processing unit 1 includes, as a function thereof, an area extraction process unit, instead of the input device. In the description below, the same reference numerals designate the same components as in the first embodiment and their description is omitted here.

In the vehicle surroundings monitoring apparatus according to this embodiment, the image processing unit 1 includes, as a function thereof, the area extraction process unit which binarizes an image obtained by at least one of the two infrared cameras 2R and 2L and extracts an area having pixel data of a predetermined threshold value or greater in the image.

The driving environment detection process unit then detects a range including more objects out of the left and right ranges ahead of the vehicle 10 as a driving environment. In this process, the driving environment detection process unit determines an area including more areas extracted by the area extraction process unit out of the left and right areas in the image binarized by the area extraction process unit. Thereafter, the driving environment detection process unit detects the range on the same side as of the determined area out of the left and right ranges ahead of the vehicle 10 as the above range. In this embodiment, the road where the vehicle 10 exists can have only one lane.

Moreover, the standard image selection process unit selects an image obtained by the infrared camera on the same side as of the range detected by the driving environment detection process unit out of the two infrared cameras 2R and 2L anew as a standard image for use in the process of the object extraction process unit. Features other than those in the above description are the same as in the first embodiment.

Now, the description will be given to the entire operation (the object detection and warning operation) of the vehicle surroundings monitoring apparatus according to this embodiment. The surroundings monitoring process in this embodiment differs from the first embodiment only in the process of selecting the standard image (step 004 in FIG. 3). The flowchart of the object detection and warning operation in this embodiment is the same as in FIG. 3. Therefore, the following description will be made with reference to the flowchart shown in FIG. 3.

Referring to FIG. 3, in step 004 of this embodiment, first, the area extraction process unit of the image processing unit 1 binarizes the image obtained by a predetermined infrared camera (for example, the infrared camera 2R) (right image) and extracts an area having pixel data of a predetermined threshold value or greater in the image. More specifically, the binarization is performed for the right image in the same manner as in step 005. It should be noted that noise reduction can be performed by converting the binarized image data to run length data and labeling to extract only areas each having dimensions of the predetermined value or greater in the same manner as in steps 006 and 007.

Subsequently, the driving environment detection process unit detects a range including more objects out of the left and right ranges ahead of the vehicle 10 as a driving environment. The distribution of background objects around the vehicle 10 is estimated based on the detected driving environment.

Now, the process of detecting the driving environment will be described with reference to FIG. 12. FIG. 12 illustrates an image obtained by the binarization for the right image and extracting the areas. The image shown in FIG. 12 has been subjected to the above noise reduction. The driving environment detection process unit sets the right area AR and the left area AL on this image. Thereafter, it calculates the total sum of the dimensions of the high-luminance areas indicated by white areas in this figure for each area to determine an area having a greater calculated value. Furthermore, the driving environment detection process unit detects a range on the same side as that of the determined area out of the left and right ranges ahead of the vehicle 10 as a range including more objects. In the example shown in FIG. 12, the left area AL in the image is determined and the left range ahead of the vehicle 10 is detected as the range including more objects. Thereby, for example, if the road has a plurality of lanes, the range where there is a roadside is assumed to include more background objects and therefore the range on the side where there is the roadside is detected. In addition, for example, if the road where the vehicle 10 is traveling is a one-lane mountain path, it is assumed that more background objects exist on the side of a mountain slope than the side of a valley as viewed from the vehicle 10, and therefore the range on the side of the mountain is detected. Subsequently, the standard image selection process unit of the image processing unit 1 selects a standard image according to the driving environment. In this situation, the left range ahead of the vehicle 10 is detected and therefore the left image obtained by the infrared camera 2L on the left side of the vehicle 10 of the infrared cameras 2R and 2L is selected as the standard image.

Thereby, similarly to the example described by using FIG. 10 in the first embodiment, it is possible to reduce the possibility of overlap between the detection object and the background object in the standard image by selecting an image obtained by an infrared camera closer to the roadside as the standard image for the side where more background objects exist such as the roadside. Moreover, when the object is extracted from the standard image in steps 005 to 008, the extraction accuracy of the object can be improved by selecting the standard image as described above, similarly to the example described by using FIG. 11 in the first embodiment. The operations other than those described above are the same as in the first embodiment.

According to this embodiment, it is possible to reduce the possibility of overlap between the detection object and the background object in the standard image when detecting the object around the vehicle 10 from the images obtained by the infrared cameras 2R and 2L, in the same manner as in the first embodiment. This improves the extraction accuracy of the object in the standard image, which leads to a proper search for the corresponding object and a proper calculation of a parallax, by which the position of the object is detected accurately.

Fifth Embodiment

Figure 13:
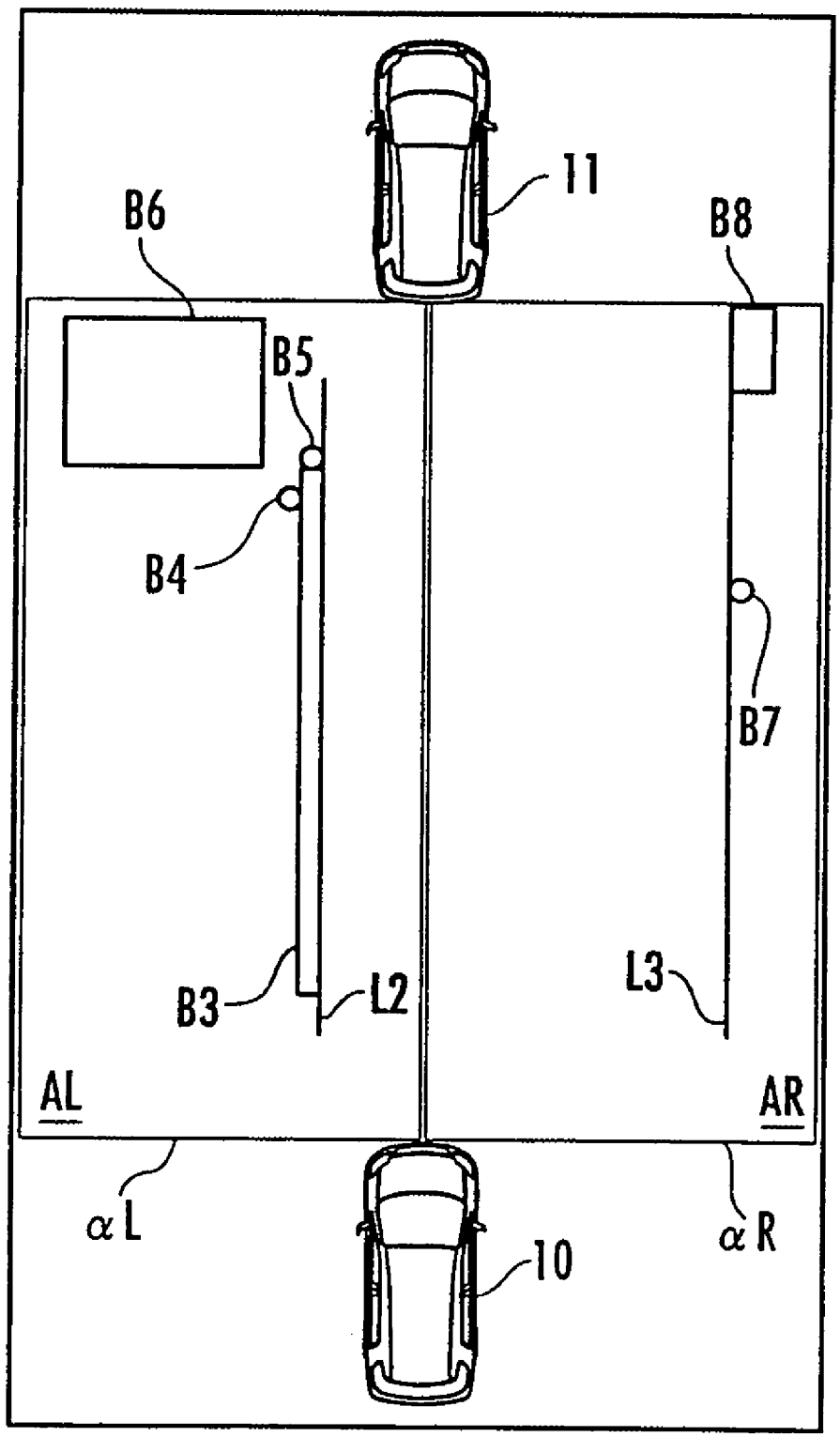
FIG. 13 is an explanatory diagram of a process of detecting a driving environment in a vehicle surroundings monitoring apparatus according to a fifth embodiment of the present invention.

The following describes a fifth embodiment of the present invention with reference to FIG. 13. This embodiment is the same as the fourth embodiment except that the image processing unit 1 includes a distance calculation process unit, instead of the area extraction process unit. In the description below, the same reference numerals designate the same components as in the fourth embodiment and their description is omitted here.

In the vehicle surroundings monitoring apparatus according to this embodiment, the image processing unit 1 includes, as a function thereof, the distance calculation process unit which calculates a distance of an object extracted by the object extraction process unit to the vehicle 10. The distance calculation process unit calculates the distance of the extracted object to the vehicle 10, for example, by using the position of the object extracted by the object extraction process unit, which has been detected by the position detection process unit.

Thereafter, the driving environment detection process unit detects a range including more objects out of the left and right ranges ahead of the vehicle 10 as a driving environment. In this detection, the driving environment detection process unit detects, as the above range, a range including more objects extracted within a predetermined distance from the vehicle 10 out of the left and right ranges ahead of the vehicle 10. In this embodiment, the road where the vehicle 10 exists may have only one lane similarly to the fourth embodiment. Features other than those in the above description are the same as in the fourth embodiment.

Now, the description will be given to the entire operation (the object detection and warning operation) of the vehicle surroundings monitoring apparatus according to this embodiment. The surroundings monitoring process in this embodiment differs from the fourth embodiment only in the process of detecting the driving environment in the process of selecting the standard image (step 004 in FIG. 3). The flowchart of the object detection and warning operation in this embodiment is the same as in FIG. 3. Therefore, the following description will be made with reference to the flowchart shown in FIG. 3.

Referring to FIG. 3, in step 004 of this embodiment, an object extraction process is performed for a predetermined standard image of the images obtained by the infrared cameras 2R and 2L, first. More specifically, the same processes as those of steps 005 to 008 are performed for the predetermined standard image to thereby extract an object. This operation corresponds to the object extraction process unit according to the present invention, similarly to the processes of steps 005 to 008. As the predetermined standard image in step 004, the image obtained by the predetermined infrared camera (for example, the infrared camera 2R) (right image) is used, for example. Alternatively, the predetermined standard image used in step 004 may be, for example, an image obtained by the same infrared camera as one for the standard image selected by the standard image selection process unit in the process in the previous sampling period.

Subsequently, the distance calculation process unit calculates a distance of the extracted object from the vehicle 10. More specifically, the same processes as those of steps 009 to 017 are performed for the extracted object and thereby the position (real space position data) of the object is detected. This operation corresponds to the position detection process unit according to the present invention similarly to the processes of steps 009 to 017. Thereafter, the distance of the extracted object from the vehicle 10 is calculated by using the detection result.

Subsequently, the driving environment detection process unit detects a range including more objects of the left and right ranges ahead of the vehicle 10 as a driving environment. The distribution of background objects around the vehicle 10 is estimated based on the detected driving environment.

Thereafter, the standard image selection process unit selects a new standard image used in the processes (processes of steps 005 to 008) of the object extraction process unit according to the above driving environment. In this embodiment, the processes of steps 005 to 017 can be omitted if the standard image used in the processes of the object extraction process unit are the same as the standard image selected anew by the standard image selection process unit in step 004, and processes of step 018 and subsequent steps can be performed by using the position (real space position data) of the object extracted by the object extraction process unit in step 004, which has been detected by the position detection process unit.

Now, the process of detecting the driving environment will be described with reference to FIG. 13. FIG. 13 shows the positions of objects B3 to B9 temporarily extracted from the right image with respect to the vehicle 10, viewed from the above of the vehicle 10. The background objects B3 to B6 on one side of the road are located in a portion exceeding a line L2 to the left side of the vehicle 10 and the background objects B7 and B8 on the other side of the road are located in a portion exceeding a line L3 to the right side of the vehicle 10.

The driving environment detection process unit sets a range (range AL enclosed by a solid line αL) within a predetermined distance from the vehicle 10 in the left range ahead of the vehicle 10 and a range (range AR enclosed by a solid line αR) within a predetermined distance from the vehicle 10 in the right range ahead of the vehicle 10. As the ranges AL and AR, further predetermined partial ranges can be set in the ranges within the predetermined distance from the vehicle 10 in the left and right ranges ahead of the vehicle 10.

Thereafter, the driving environment detection process unit detects which of the ranges AL and AR includes more background objects. In the example shown in FIG. 13, the range AL includes more background objects than the range AR and therefore the driving environment detection process unit detects that the left range ahead of the vehicle 10 is the range including more background objects as a driving environment.

Thereby, for example, if the road has a plurality of lanes, it is assumed that a range where there is a roadside includes more background objects than a range where there is an oncoming lane. Therefore, the range where there is the roadside is detected similarly to the fourth embodiment. For example, if the road where the vehicle 10 is traveling is a one-lane mountain path, it is assumed that more background objects exist on the side of a mountain slope than the side of a valley as viewed from the vehicle 10, and therefore the range on the side of the mountain is detected in the same manner as in the fourth embodiment. The operations other than those in the above description are the same as in the fourth embodiment.

According to this embodiment, it is possible to reduce the possibility of overlap between the detection object and the background object on the standard image when detecting the object around the vehicle 10 from the images obtained by the infrared cameras 2R and 2L, in the same manner as in the fourth embodiment. This improves the extraction accuracy of the object in the standard image, which leads to a proper search for the corresponding object and a proper calculation of a parallax, by which the position of the object is detected accurately.

While the distance calculation process unit calculates the distance of the object with respect to the vehicle 10 by using the detection result obtained by the position detection process unit in this embodiment, it can also calculate the distance of the object with respect to the vehicle 10 on the basis of the images obtained by the infrared cameras 2R and 2L and the objects extracted by the object extraction process unit without using the detection result obtained by the position detection process unit in another embodiment. Furthermore, the distance calculation process unit can also calculate the distance of the object with respect to the vehicle 10 by using positional information of the object detected by a millimeter wave radar or other sensors instead of the images obtained by the infrared cameras 2R and 2L.

Moreover, while the infrared cameras are used as image sensors in the above first to fifth embodiments, for example, normal CCD cameras or the like capable of detecting only visible light can be used, too. It should be noted that, however, the process of extracting a pedestrian, a traveling vehicle or the like can be simplified by using the infrared cameras, by which the present invention can be achieved by using an arithmetic unit whose arithmetic capacity is relatively low.

What is claimed is:

1. A vehicle surroundings monitoring apparatus which detects objects existing around a vehicle from images obtained by a plurality of image sensors comprising a pair of image sensors mounted on left and right sides of the vehicle, said vehicle surroundings monitoring apparatus comprising:

an object extraction process unit which extracts the objects from a predetermined standard image of the images obtained by the plurality of the image sensors;

a driving environment detection process unit which detects a driving environment of the vehicle; and a standard image selection process unit which newly selects a standard image for use in the process of the object extraction process unit out of the images obtained by the plurality of the image sensors according to the driving environment detected by the driving environment detection process unit;

wherein said standard selection process unit newly selects an image obtained by one of the image sensors as the standard image when the following conditions are satisfied:

$X0:X1=Z0:Z1$; and $X0-B:X1-B=Z0:Z2$, where,
X0 is a distance in an X-axis direction between a detection object and the other of the image sensors;
X1 is a distance in an X-axis direction between a first background object and the other of the image sensors;
Z0 is a distance in a Z-axis direction between the detection object and the other of the image sensors;
Z1 is a distance in a Z-axis direction between the first background object and the other of image sensors;
Z2 is a distance in a Z-axis direction between a second background object and the other of the image sensors; and
B is a distance in an X-axis direction between the pair of image sensors;
wherein said X-axis direction and said Z-axis direction are arranged according to Cartesian coordinate system, where Z-axis is parallel to a longitudinal axis of the vehicle, and X-axis is parallel to a widthwise axis of the vehicle;

wherein the detection object is extracted from the standard image obtained by said one of the image sensors;

wherein said first and second background objects exist on a nearest roadside of a traveling lane of the vehicle, wherein said nearest roadside excludes an oncoming traffic lane; and wherein said standard image selection process unit is operable to select one of the pair of image sensors having a smaller angle between a straight line connecting the detection object and the image sensor and the Z-axis direction, as a standard image sensor, when said conditions X0:X1=Z0:Z1; and X0−B:X1−B=Z0:Z2 are satisfied.

2. A vehicle surroundings monitoring apparatus according to claim 1, further comprising a position detection process unit which detects the position of the object with respect to the vehicle based on the images obtained by the plurality of the image sensors and the object extracted by the object extraction process unit.

3. A vehicle surroundings monitoring apparatus according to claim 1, wherein:
a road where the vehicle exists has a plurality of lanes;
the driving environment detection process unit detects a roadside of the road where the vehicle exists as the driving environment; and
the standard image selection process unit newly selects an image obtained by an image sensor closest to the roadside of the road detected by the driving environment detection process unit among the plurality of the image sensors as the standard image for use in the process of the object extraction process unit.

4. A vehicle surroundings monitoring apparatus according to claim 2, wherein:
a road where the vehicle exists has a plurality of lanes;
the driving environment detection process unit detects a roadside of the road where the vehicle exists as the driving environment; and
the standard image selection process unit newly selects an image obtained by an image sensor closest to the roadside of the road detected by the driving environment detection process unit among the plurality of the image sensors as the standard image for use in the process of the object extraction process unit.

5. A vehicle surroundings monitoring apparatus according to claim 3, further comprising an input device to which an occupant of the vehicle inputs information on the roadside of the road, wherein the driving environment detection process unit detects the roadside of the road where the vehicle exists on the basis of the information on the roadside of the road input to the input device.

6. A vehicle surroundings monitoring apparatus according to claim 4, further comprising an input device to which an occupant of the vehicle inputs information on the roadside of the road, wherein the driving environment detection process unit detects the roadside of the road where the vehicle exists on the basis of the information on the roadside of the road input to the input device.

7. A vehicle surroundings monitoring apparatus according to claim 3, wherein:
the vehicle has a vehicle navigation system; and
the driving environment detection process unit detects the roadside of the road where the vehicle exists on the basis of the information on the roadside of the road obtained by the vehicle navigation system.

8. A vehicle surroundings monitoring apparatus according to claim 4, wherein:
the vehicle has a vehicle navigation system; and
the driving environment detection process unit detects the roadside of the road where the vehicle exists on the basis of the information on the roadside of the road obtained by the vehicle navigation system.

9. A vehicle surroundings monitoring apparatus according to claim 3, further comprising a relative speed calculation process unit which calculates a relative speed of each of the objects extracted by the object extraction process unit with respect to the vehicle, wherein the driving environment detection process unit selects another vehicle coming from the opposite direction to that of the vehicle out of the extracted objects on the basis of the relative speed calculated by the relative speed calculation process unit and detects the roadside of the road where the vehicle exists on the basis of the position of the selected another vehicle.

10. A vehicle surroundings monitoring apparatus according to claim 4, further comprising a relative speed calculation process unit which calculates a relative speed of each of the objects extracted by the object extraction process unit with respect to the vehicle, wherein the driving environment detection process unit selects another vehicle coming from the opposite direction to that of the vehicle out of the extracted objects on the basis of the relative speed calculated by the relative speed calculation process unit and detects the roadside of the road where the vehicle exists on the basis of the position of the selected another vehicle.

11. A vehicle surroundings monitoring apparatus according to claim 1, wherein:
a plurality of the image sensors are located on the left side and the right side in the front of the vehicle, respectively, and are two image sensors which image views ahead of the vehicle;
the driving environment detection process unit detects a range including more objects of the left and right ranges ahead of the vehicle as the driving environment; and
the standard image selection process unit selects anew an image obtained by the image sensor on the side of the range detected by the driving environment detection process unit of the two image sensors as the standard image for use in the process of the object extraction process unit.

12. A vehicle surroundings monitoring apparatus according to claim 2, wherein:
a plurality of the image sensors are located on the left side and the right side in the front of the vehicle, respectively, and are two image sensors which image views ahead of the vehicle;
the driving environment detection process unit detects a range including more objects of the left and right ranges ahead of the vehicle as the driving environment; and
the standard image selection process unit selects anew an image obtained by the image sensor on the side of the range detected by the driving environment detection process unit of the two image sensors as the standard image for use in the process of the object extraction process unit.

13. A vehicle surroundings monitoring apparatus according to claim 11, further comprising an area extraction process unit which extracts an area having pixel data of a predetermined threshold value or greater in the image by binarizing the image obtained by at least one of the two image sensors, wherein the driving environment detection process unit determines an area including more areas extracted by the area extraction process unit out of the left and right areas in the image and detects a range on the same side as the determined area of the left and right ranges ahead of the vehicle as the range including more objects.

14. A vehicle surroundings monitoring apparatus according to claim 12, further comprising an area extraction process unit which extracts an area having pixel data of a predetermined threshold value or greater in the image by binarizing the image obtained by at least one of the two image sensors, wherein the driving environment detection process unit determines an area including more areas extracted by the area extraction process unit out of the left and right areas in the image and detects a range on the same side as the determined area of the left and right ranges ahead of the vehicle as the range including more objects.

15. A vehicle surroundings monitoring apparatus according to claim 11, further comprising a distance calculation process unit which calculates a distance of each of the objects extracted by the object extraction process unit with respect to the vehicle, wherein the driving environment detection process unit detects a range including more extracted objects within a predetermined distance from the vehicle of the left and right ranges ahead of the vehicle as the range including more objects.

16. A vehicle surroundings monitoring apparatus according to claim 12, further comprising a distance calculation process unit which calculates a distance of each of the objects extracted by the object extraction process unit with respect to the vehicle, wherein the driving environment detection process unit detects a range including more extracted objects within a predetermined distance from the vehicle of the left and right ranges ahead of the vehicle as the range including more objects.

17. A vehicle surroundings monitoring apparatus which detects objects existing around a vehicle from images obtained by a plurality of image sensors comprising a pair images sensors mounted on left and right sides of the vehicle, said vehicle surroundings monitoring apparatus comprising:
an object extraction process unit which extracts the objects from a predetermined standard image of the images obtained by a plurality of the image sensors; and
a standard image selection process unit which newly selects an image obtained by a predetermined image sensor, which is closest to a roadside of a road where the vehicle exists and having a plurality of lanes, of the plurality of the image sensors as a standard image for use in the process of the object extraction process unit,
wherein said standard selection process unit newly selects an image obtained by one of the image sensors as the standard image when the following conditions are satisfied:

$X0:X1=Z0:Z1$; and $X0-B:X1-B=Z0:Z2$, where,
X0 is a distance in an X-axis direction between a detection object and the other of the image sensors;
X1 is a distance in an X-axis direction between a first background object and the other of the image sensors;
Z0 is a distance in a Z-axis direction between the detection object and the other of the image sensors;
Z1 is a distance in a Z-axis direction between the first background object and the other of image sensors;
Z2 is a distance in a Z-axis direction between a second background object and the other of the image sensors; and
B is a distance in an X-axis direction between the pair of image sensors;
wherein said X-axis direction and said Z-axis direction are arranged according to Cartesian coordinate system, where Z-axis is parallel to a longitudinal axis of the vehicle, and X-axis is parallel to a width-wise axis of the vehicle;
wherein the detection object is extracted by the object extraction process unit from the standard image obtained by said one of the image sensors;
wherein said first and second background objects exist on a nearest roadside of a traveling lane of the vehicle, wherein said nearest roadside excludes an oncoming traffic lane; and
wherein said standard image selection process unit is operable to select one of the pair of image sensors having a smaller angle between a straight line connecting the detection object and the image sensor and the Z-axis direction, as a standard image sensor, when said conditions $X0:X1=Z0:Z1$; and $X0-B:X1-B=Z0:Z2$ are satisfied.

18. A vehicle surroundings monitoring apparatus, which is provided with a computer having an interface circuit for accessing data of images obtained by a plurality of image sensors comprising a pair of image sensors mounted on left and right sides of a vehicle, and which detects objects existing around the vehicle by arithmetic processing performed by the computer, wherein the computer performs:
an object extraction process of extracting the objects from a predetermined standard image of the images obtained by a plurality of the image sensors;
a driving environment detection process of detecting a driving environment of the vehicle; and
a standard image selection process of newly selecting a standard image for use in the process of the object extraction process out of the images obtained by a plurality of the image sensors according to the driving environment detected in the driving environment detection process;
wherein said standard selection process newly selects an image obtained by one of the image sensors as the standard image when the following conditions are satisfied:

$X0:X1=Z0:Z1$; and $X0-B:X1-B=Z0:Z2$, where,
X0 is a distance in an X-axis direction between a detection object and the other of the image sensors;
X1 is a distance in an X-axis direction between a first background object and the other of the image sensors;
Z0 is a distance in a Z-axis direction between the detection object and the other of the image sensors;
Z1 is a distance in a Z-axis direction between the first background object and the other of image sensors;
Z2 is a distance in a Z-axis direction between a second background object and the other of the image sensors; and
B is a distance in an X-axis direction between the pair of image sensors;
wherein said X-axis direction and said Z-axis direction are arranged according to Cartesian coordinate system, where Z-axis is parallel to a longitudinal axis of the vehicle, and X-axis is parallel to a width-wise axis of the vehicle; and
wherein the detection object is extracted by the object extraction process from the standard image obtained by said one of the image sensors;
wherein said first and second background objects exist on a nearest roadside of a traveling lane of the vehicle, wherein said nearest roadside excludes an oncoming traffic lane; and
wherein said standard image selection process is configured to select one of the pair of image sensors having a smaller angle between a straight line connecting the detection object and the image sensor and the Z-axis direction, as a standard image sensor, when said conditions X0:X1=Z0:Z1; and X0−B:X1−B=Z0:Z2 are satisfied.

19. A vehicle surroundings monitoring method which detects objects existing around a vehicle from images obtained by a plurality of image sensors comprising a pair of image sensors mounted on left and right sides of the vehicle, said vehicle surroundings monitoring method comprising:
an object extraction step of extracting the objects from a predetermined standard image of the images obtained by a plurality of the image sensors;
a driving environment detection step of detecting a driving environment of the vehicle; and
a standard image selection step of newly selecting a standard image for use in the process of the object extraction step out of the images obtained by a plurality of the image sensors according to the driving environment detected in the driving environment detection step;
wherein said standard selection process step newly selects an image obtained by one of the image sensors as the standard image when the following conditions are satisfied:

$X0{:}X1=Z0{:}Z1$; and $X0-B{:}X1-B=Z0{:}Z2,$ where,
X0 is a distance in an X-axis direction between a detection object and the other of the image sensors;
X1 is a distance in an X-axis direction between a first background object and the other of the image sensors;
Z0 is a distance in a Z-axis direction between the detection object and the other of the image sensors;
Z1 is a distance in a Z-axis direction between the first background object and the other of image sensors;
Z2 is a distance in a Z-axis direction between a second background object and the other of the image sensors; and
B is a distance in an X-axis direction between the pair of image sensors;
wherein said X-axis direction and said Z-axis direction are arranged according to Cartesian coordinate system, where Z-axis is parallel to a longitudinal axis of the vehicle, and X-axis is parallel to a width-wise axis of the vehicle; and
wherein the detection object is extracted by the object extraction step from the standard image obtained by the said of the image sensors;
wherein said first and second background objects exist on a nearest roadside of a traveling lane of the vehicle, wherein said nearest roadside excludes an oncoming traffic lane; and
wherein said standard image selection process step further comprises the method step of selecting one of the pair of image sensors having a smaller angle between a straight line connecting the detection object and the image sensor and the Z-axis direction, as a standard image sensor, when said conditions X0:X1=Z0:Z1; and X0−B:X1−B=Z0:Z2 are satisfied.

20. A non-transitory computer-readable storage medium with an executable vehicle surroundings monitoring program stored thereon, wherein when executed, the program causes a computer to perform a process of detecting objects existing around a vehicle from images obtained by a plurality of image sensors comprising a pair of image sensors mounted on left and right side of the vehicle, said vehicle surroundings monitoring program having functions of causing the computer to perform:
an object extraction process of extracting the objects from a predetermined standard image of the images obtained by a plurality of the image sensors;
a driving environment detection process of detecting a driving environment of the vehicle; and
a standard image selection process of newly selecting a standard image for use in the object extraction process out of the images obtained by a plurality of the image sensors according to the driving environment detected in the driving environment detection process;
wherein said standard selection process newly selects an image obtained by one of the image sensors as the standard image when the following conditions are satisfied:

$X0{:}X1=Z0{:}Z1$; and $X0-B{:}X1-B=Z0{:}Z2,$ where,
X0 is a distance in an X-axis direction between a detection object and the other of the image sensors;
X1 is a distance in an X-axis direction between a first background object and the other of the image sensors;
Z0 is a distance in a Z-axis direction between the detection object and the other of the image sensors;
Z1 is a distance in a Z-axis direction between the first background object and the other of image sensors;
Z2 is a distance in a Z-axis direction between a second background object and the other of the image sensors; and
B is a distance in an X-axis direction between the pair of image sensors;
wherein said X-axis direction and said Z-axis direction are arranged according to Cartesian coordinate system, where Z-axis is parallel to a longitudinal axis of the vehicle, and X-axis is parallel to a width-wise axis of the vehicle; and
wherein the detection object is extracted by the object extraction process from the standard image obtained by said one of the image sensors;
wherein said first and second background objects exist on a nearest roadside of a traveling lane of the vehicle, wherein said nearest roadside excludes an oncoming traffic lane; and
wherein said standard image selection process is configured to select one of the pair of image sensors having a smaller angle between a straight line connecting the detection object and the image sensor and the Z-axis direction, as a standard image sensor, when said conditions X0:X1=Z0:Z1; and X0−B:X1−B=Z0:Z2 are satisfied.

* * * * *